United States Patent [19]
Ema et al.

[11] Patent Number: 5,258,780
[45] Date of Patent: Nov. 2, 1993

[54] BEAM RECORDER FORMING LOW DENSITY DOTS

[75] Inventors: Hidetoshi Ema, Yokohama; Hitoshi Hattori, Sagamihara; Masaaki Ishida, Tokyo; Susumu Imakawa, Yokohama; Yoshinobu Takeyama, Kawasaki, all of Japan

[73] Assignee: Ricoh Company, Ltd., Tokyo, Japan

[21] Appl. No.: 694,906

[22] Filed: May 2, 1991

[30] Foreign Application Priority Data

| May 9, 1990 | [JP] | Japan | 2-119126 |
| May 9, 1990 | [JP] | Japan | 2-119127 |
| May 9, 1990 | [JP] | Japan | 2-119128 |
| May 9, 1990 | [JP] | Japan | 2-119129 |
| May 9, 1990 | [JP] | Japan | 2-119130 |
| May 9, 1990 | [JP] | Japan | 2-119131 |
| May 10, 1990 | [JP] | Japan | 2-120879 |
| May 10, 1990 | [JP] | Japan | 2-120880 |
| May 10, 1990 | [JP] | Japan | 2-120881 |
| May 15, 1990 | [JP] | Japan | 2-124502 |
| May 15, 1990 | [JP] | Japan | 2-124503 |
| May 15, 1990 | [JP] | Japan | 2-124504 |
| May 18, 1990 | [JP] | Japan | 2-128861 |
| May 18, 1990 | [JP] | Japan | 2-128862 |
| May 18, 1990 | [JP] | Japan | 2-128863 |
| May 18, 1990 | [JP] | Japan | 2-128864 |
| May 18, 1990 | [JP] | Japan | 2-128865 |
| May 18, 1990 | [JP] | Japan | 2-128866 |
| May 18, 1990 | [JP] | Japan | 2-128867 |
| May 18, 1990 | [JP] | Japan | 2-128868 |

[51] Int. Cl.$^5$ .............................................. H04N 1/21
[52] U.S. Cl. ................................. 346/108; 358/298
[58] Field of Search ............... 346/76 L, 108, 160; 358/296, 298, 300, 302

[56] References Cited

U.S. PATENT DOCUMENTS

| 4,714,954 | 12/1987 | Yoshinaka et al. | |
| 4,873,537 | 10/1989 | Ohta | 346/108 |
| 4,894,524 | 1/1990 | Murase et al. | 346/108 |

FOREIGN PATENT DOCUMENTS

| 0359248 | 3/1990 | European Pat. Off. |
| 352011A1 | 1/1986 | Fed. Rep. of Germany |
| 3609252A1 | 10/1986 | Fed. Rep. of Germany |
| 57-159173 | 10/1982 | Japan |
| 1-69370 | 3/1989 | Japan |

*Primary Examiner*—Mark J. Reinhart
*Attorney, Agent, or Firm*—Mason, Fenwick & Lawrence

[57] ABSTRACT

An image forming apparatus includes a semiconductor laser unit for emitting a laser beam, a photosensitive drum which rotates in a first direction, a scanning optical system for making the laser beam scan the photosensitive drum in a second direction perpendicular to the first direction, wherein an electrophotography process is carried out on the surface of the photosensitive drum, a data generator for generating intensity data for each dot in an image in accordance with image information supplied from an external controller, and a laser driver for outputting a driving signal which drives the semiconductor laser unit, the driving signal having a pulse width and a level for each dot in an image, the pulse width being a predetermined value less than a value corresponding to an interval between adjacent dots formed in a direction parallel to the first direction, and the level corresponding to the intensity data generated by the data generator.

17 Claims, 24 Drawing Sheets

2×2 DOT MATRIX

1×2 DOT MATRIX

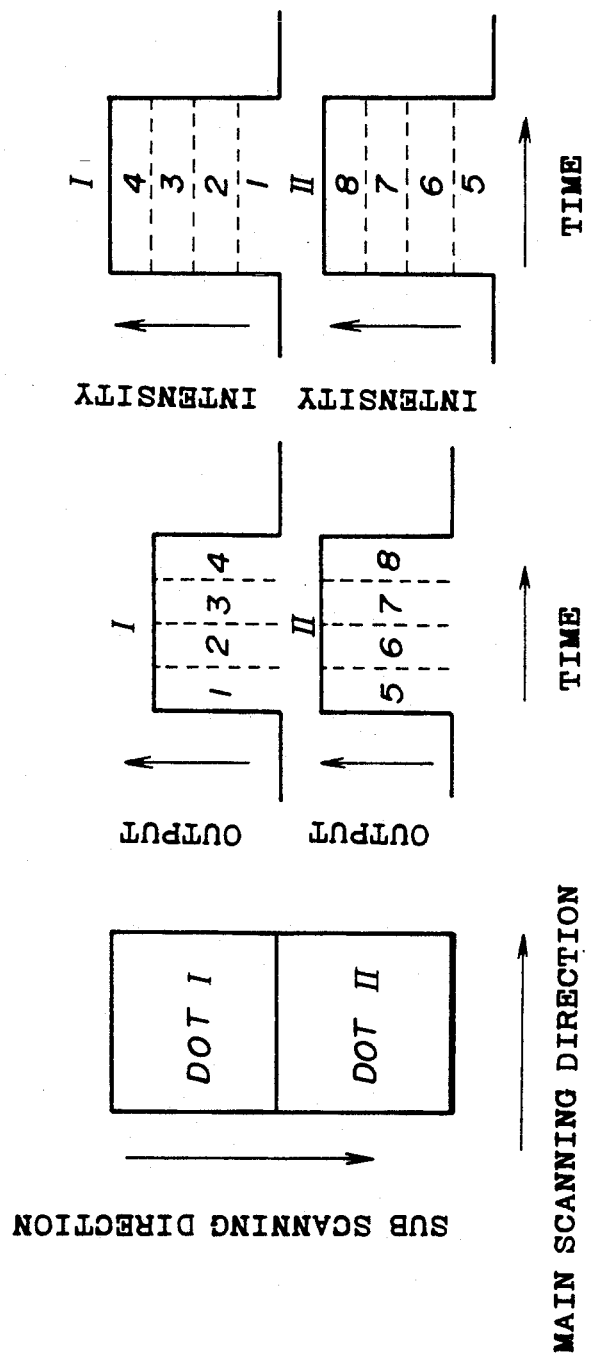

2×2 DOT MATRIX

1×4 DOT MATRIX

FIG. 34

| | j-1 | j |
|---|---|---|
| i-1 | $A_{i-1,j-1}$ | $A_{i-1,j}$ |

FIG. 35

| | j-1 | j | j+1 |
|---|---|---|---|
| i-1 | $A_{i-1,j-1}$ | $A_{i-1,j}$ | $A_{i-1,j+1}$ |
| i | $A_{i,j-1}$ | $A_{i,j}$ | $A_{i,j+1}$ |
| i+1 | $A_{i+1,j-1}$ | $A_{i+1,j}$ | $A_{i+1,j+1}$ |

FIG. 36A $$\begin{bmatrix} 0 & -1 & 0 \\ -1 & 4 & -1 \\ 0 & -1 & 0 \end{bmatrix}$$

FIG. 36B $$\begin{bmatrix} -1 & -1 & -1 \\ -1 & 8 & -1 \\ -1 & -1 & -1 \end{bmatrix}$$

BEAM RECORDER FORMING LOW DENSITY DOTS

BACKGROUND OF THE INVENTION

The present invention generally relates to an image forming apparatus, and more particularly to an image forming apparatus such as a laser beam printer capable of being applied to digital copy machines and the like, and preferably applied to digital color copy machines.

Laser beam printers are manufactured based on an electrophotography technology and a laser beam scanning technology. As a high quality image can be rapidly obtained, use of the laser beam printers as output devices of computers and printer units of digital copy machines has spread. In the laser beam printer, to obtain a high quality image, a density for every dot is controlled. When the density for each dot is controlled, an image having good gradation and resolution can be obtained. There are two types of methods for controlling the density for each dot. A first method modulates an intensity of a laser beam emitted from a semiconductor laser unit in accordance with image information. This first method is often referred to as beam intensity modulation. A second method modulates a width of a driving pulse signal, which drives the semiconductor laser unit, in accordance with the image information. This second method is often referred to as pulse width modulation.

In pulse width modulation, as the semiconductor laser unit is controlled so as to be only turned on or off, it is possible to stably record an image. However, when a scanning speed of the laser beam increases (a frequency of a writing clock increases), a minimum pulse width decreases. For example, in a case where gradational image data having 256 levels is represented for each dot, when the frequency of the writing clock is 20 MHz, the minimum pulse width is approximately 0.2 nsec. In this case, it is difficult to control the pulse width at the minimum pulse width.

On the other hand, in beam intensity modulation, for example, due to a light-electricity negative feed back loop in which an intensity variation of the laser beam is rapidly fed back to the driving signal of the semiconductor laser beam, the intensity of the laser beam can be correctly controlled in accordance with the image information. In this case, the gradational image having 256 levels can be represented for each dot at a writing clock having a frequency of 25 MHz. However, in a case where an image is formed by use of an electrophotography process, as the laser beam emitted from the semiconductor laser unit is a Gaussian beam so that adjacent dots formed by the laser beam overlap each other, beam intensity modulation has the following disadvantages.

(1) Due to a speed variation of a photosensitive member (a recording medium) moving in a predetermined direction, the density of the image varies in the moving direction of the photosensitive member. As the laser beam is a Gaussian beam, when the speed of the photosensitive member varies, an overlapped area in which adjacent dots are overlap each other varies. As a result, the amount of toner adhered to the overlapped area on the photosensitive member varies, so that the density of the image varies in the moving direction of the photosensitive member.

(2) Due to a position variation of an optical device such as a polygonal mirror, the density of the image varies. When the position of the optical device varies, the position of the beam spot projected onto the surface of the photosensitive member varies. As a result, the amount of toner adhered to the overlapped area on the photosensitive member varies, so that the density of the image varies.

(3) In a case where a low density dot is formed, an electrical potential curve (a potential distribution) at an area, corresponding to the low density dot, on the surface of the photosensitive member has a gently sloping shape. Thus it is difficult to constantly adhere the toner to areas corresponding to low density dots, so that it is difficult to form the low density dots with a constant density. That is, the reproducibility of the density for the low density dots deteriorates.

SUMMARY OF THE INVENTION

Accordingly, a general object of the present invention is to provide a novel and useful image forming apparatus in which the disadvantages of the aforementioned prior art are eliminated.

A more specific object of the present invention is to provide an image forming apparatus capable of forming high quality images.

Another object of the present invention is to provide an image forming apparatus in which there is little variation in the density of the image even if the speed of the photosensitive member moving in a predetermined direction and/or the position of the optical device vary.

A further object of the present invention is to provide an image forming apparatus capable of forming low density dots with a constant density.

The above objects of the present invention are achieved by an image forming apparatus comprising: light beam emitting means for emitting a light beam; a recording medium which moves in a first direction; scanning means for making the light beam emitted from the light emitting means scan the recording medium in a second direction perpendicular to the first direction, wherein an electrophotography process is carried out on the surface of the recording medium; driving data generating means for generating intensity data for each dot in an image in accordance with image information supplied from an external controller; and driving means, coupled to the light beam emitting means and the driving data generating means, for outputting a driving signal which drives the light beam emitting means, the driving signal having a pulse width and a level for each dot in an image, the pulse width being a predetermined value less than a value corresponding to an interval between adjacent dots formed in a direction parallel to the first direction, and the level corresponding to the intensity data generated by the driving data generating means.

The above objects of the present invention are also achieved by an image forming apparatus comprising: light beam emitting means for emitting a light beam; a recording medium which moves in a first direction; scanning means for making the light beam emitted from the light emitting means scan the recording medium in a second direction perpendicular to the first direction, wherein an electrophotography process is carried out on the surface of the recording medium; driving data generating means for generating width data and intensity data for each dot in an image, the width data being selected in accordance with image information supplied from an external controller from a plurality of width values which have been previously determined, and the intensity data being generated in accordance with the selected width value and the image information; and driving means, coupled to the light beam emitting means and the driving data generating means, for outputting a driving signal which drives the light beam emitting means, the driving signal having a pulse width and a level for each dot in an image, the pulse width corresponding to the width data generated by the driving data generating means, and the level corresponding to the intensity data generated by the driving data generating means.

The above objects of the present invention are also achieved by an image forming apparatus comprising: light beam emitting means for emitting a light beam; a recording medium which moves in a first direction; scanning means for making the light beam emitted from the light emitting means scan the recording medium in a second direction perpendicular to the first direction, wherein an electrophotography process is carried out on the surface of the recording medium; driving data generating means for generating width data and intensity data for each dot in a dot matrix, in which M dots are arranged in the second direction and N dots are arranged in the first direction, in accordance with image information supplied from an external controller, the width data being selected in accordance with the image information from a plurality of width values which have been previously determined, and the intensity data being determined in accordance with the selected width value and the image information; and driving means, coupled to the light beam emitting means and the driving data generating means, for outputting a driving signal which drives the light beam emitting means, the driving signal having a pulse width and a level for each dot, the pulse width corresponding to the width data generated by the driving data generating means, and the level corresponding to the intensity data generated by the driving data generating means.

The above object of the present invention are also achieved by an image forming apparatus comprising: light beam emitting means for emitting a light beam; a recording medium which moves in a first direction; scanning means for making the light beam emitted from the light emitting means scan the recording medium in a second direction perpendicular to the first direction, wherein an electrophotography process is carried out on the surface of the recording medium; driving data generating means for generating driving data for each dot in a dot matrix in which M dots are arranged in the second direction and N dots are arranged in the first direction, where $M \geq 1$ and $N \geq 2$, the driving data for each dot being generated so that exposure dots onto which the light beam should be projected are arranged in the dot matrix in accordance with image information supplied from an external controller under a condition where a spatial frequency of an image in a direction parallel to the first direction is the maximum; and driving means, coupled to the light beam emitting means and the driving data generating means, for outputting a driving signal which drives the light beam emitting means, the driving signal having a pulse width and a level for each dot, at least either pulse width or the level corresponding to the driving data for each dot generated by the driving data generating means.

The above objects of the present invention are also achieved by an image forming apparatus comprising: light beam emitting means for emitting a light beam; a recording medium which moves in a first direction; scanning means for making the light beam emitted from the light emitting means scan the recording medium in a second direction perpendicular to the first direction, wherein an electrophotography process is carried out on the surface of the recording medium; driving data generating means including a first generating means for generating width data and intensity data for each dot in an image in accordance with image information supplied from an external controller, the width data having a value less than a value corresponding to an interval between adjacent dots in a direction parallel to the first direction, the intensity data being generated in accordance with the image information, second generating means for generating driving data for each dot in a dot matrix in which M dots are arranged in the second direction and N dots are arranged in the first direction in accordance with image information supplied from an external controller, and selecting means for selecting either the first generating means or the second generating means in accordance with the image information supplied from the external controller, wherein the driving data generating means outputs the width data and the intensity data when the first generating means is selected, and outputs the driving data when the second generating means is selected; and driving means, coupled to the light beam emitting means and the driving data generating means, for outputting a driving signal which drives the light beam emitting means, the driving signal having a pulse width and a level for each dot, the pulse width and the level corresponding to the width data and the intensity data output from the first generating means when the first generating means is selected, and the pulse width and the level corresponding to the driving data output from the second generating means when the second generating means is selected.

The above objects of the present invention are also achieved by an image forming apparatus comprising: light beam emitting means for emitting a light beam; a recording medium which moves in a first direction; scanning means for making the light beam emitted from the light emitting means scan the recording medium in a second direction perpendicular to the first direction, wherein an electrophotography process is carried out on the surface of the recording medium; driving data generating means including a first generating means for generating width data and intensity data for each dot in an image in accordance with image information supplied from an external controller, the width data being selected in accordance with image information supplied from an external controller from a plurality of width values which have been previously determined, and the intensity data being generated in accordance with the selected width value and the image information, second generating means for generating driving data for each dot in a dot matrix in which M dots are arranged in the second direction and N dots are arranged in the first direction in accordance with the image information supplied from the external controller, and selecting means for selecting either the first generating means or the second generating means in accordance with the image information supplied from the external controller, wherein the driving data generating means outputs the width data and the intensity data when the first generating means is selected, and outputs the driving data when the second generating means is selected; and driving means, coupled to the light beam emitting means and the driving data generating means, for outputting a driving signal which drives the light beam emitting means, the driving signal having a pulse width and a level for each dot, the pulse width and the level corresponding to the width data and the intensity data output from the first generating means when the first generating means is selected, and the pulse width and the level corresponding to the driving data output from the second generating means when the second generating means is selected.

The above objects of the present invention are also achieved by an image forming apparatus comprising: light beam emitting means for emitting a light beam; a recording medium which moves in a first direction; scanning means for making the light beam emitted from the light emitting means scan the recording medium in a second direction perpendicular to the first direction, wherein an electrophotography process is carried out on the surface of the recording medium; driving data generating means including a first generating means for generating driving data for each dot in an image in accordance with image information supplied from an external controller, second generating means for generating driving data for each dot in a dot matrix in which M dots are arranged in the second direction and N dots are arranged in the first direction, where $M \geq 1$ and $N \geq 2$, the driving data for each dot being generated so that exposure dots onto which the light beam should be projected are arranged in the dot matrix in accordance with the image information supplied from the external controller under a condition where a spatial frequency of an image in a direction parallel to the first direction is the maximum, and selecting means for for selecting either the first generating means or the second generating means in accordance with the image information supplied from the external controller; and driving means, coupled to the light beam emitting means and the driving data generating means, for outputting a driving signal which drives the light beam emitting means, the driving signal having a pulse width and a level for each dot, at least either the pulse width or the level corresponding to the driving data output from the first generating means when the first generating means is selected, and the pulse width and the level corresponding to the driving data output from the second generating means when the second generating means is selected.

Additional objects, features and advantages of the present invention will become apparent from the following detailed description when read in conjunction with the accompanying drawings.

BRIEF DESCRIPTION OF THE DRAWINGS

FIG. 7 is a graph illustrating a density variation $\Delta D$ which is generated due to the variation of the rotation speed of the photosensitive drum and the like;

FIG. 12 is a graph illustrating a density variation $\Delta D$ which is generated due to the variation of the rotation speed of the photosensitive drum and the like;

FIG. 25A is a diagram illustrating an example of a $1 \times 2$ dot matrix;

FIG. 25B is a diagram illustrating an example of the pulse width modulation in the $1 \times 2$ dot matrix shown in FIG. 25A;

FIG. 25C is a diagram illustrating an example of the beam intensity modulation in the $1 \times 2$ dot matrix shown in FIG. 25A;

FIG. 26 is a graph illustrating the density variation $\Delta D$ which is generated due to the variation of the rotation speed of the photosensitive drum and the like;

FIG. 34 is a diagram illustrating an example of a 2×2 dot matrix which is used for calculating a differential coefficient;

FIG. 35 is a diagram illustrating an example of 3×3 dot matrix which is used for calculating the differential coefficient;

FIGS. 36A and 36B are diagrams illustrating spatial filters which are used for calculating the differential coefficient;

DESCRIPTION OF THE PREFERRED EMBODIMENTS

A description will now be given of a basic structure of a laser printer which is an embodiment of the present invention, with reference to FIG. 1.

Figure 1:
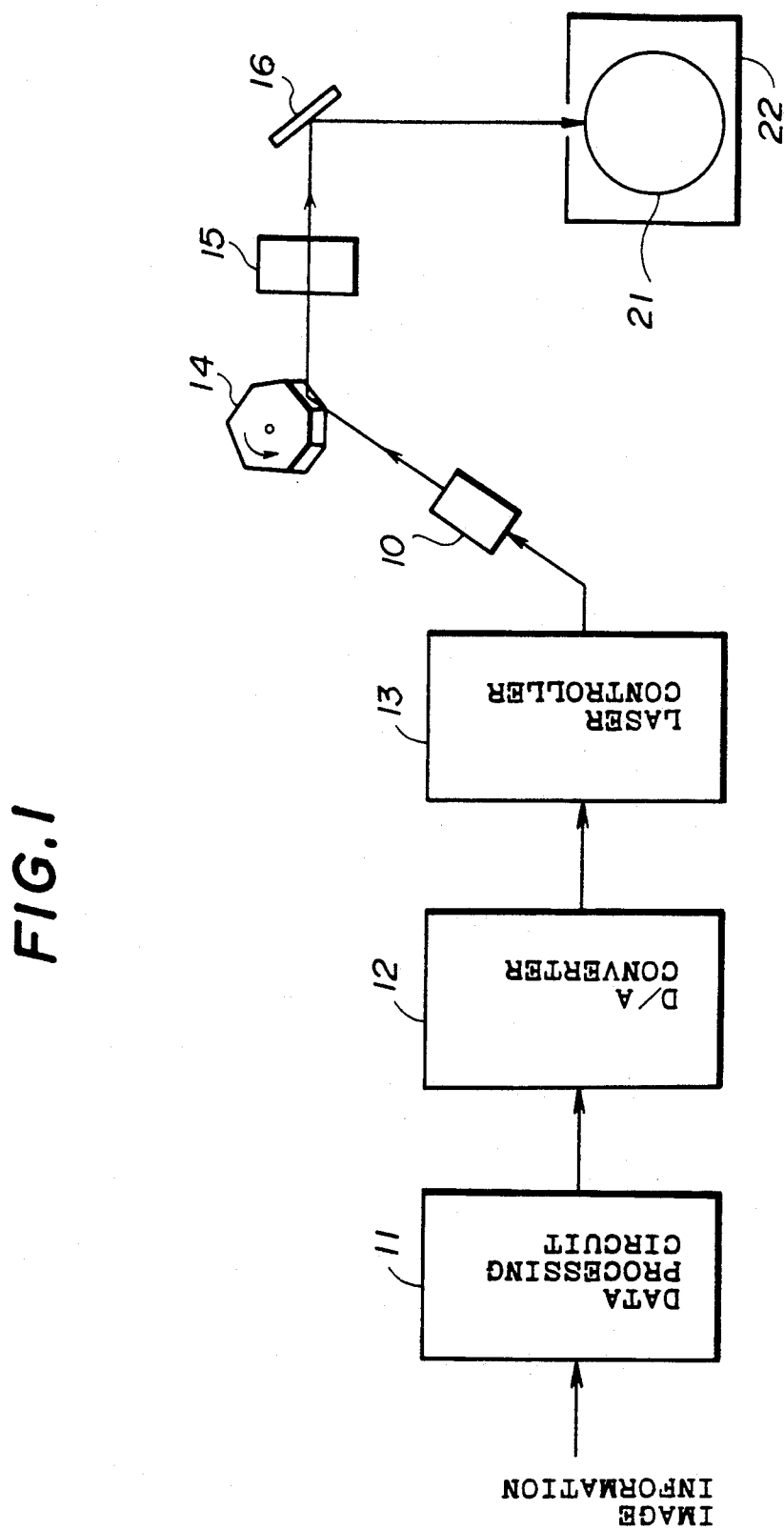
FIG. 1 is a block diagram illustrating a basic structure of a laser beam printer.

Referring to FIG. 1, a image data is supplied from a CPU (not shown) to a data processing circuit 11 dot by dot. The data processing circuit 11 converts the image data for each dot supplied from the CPU into a driving pattern data for driving a semiconductor laser unit 10. A digital-analog converter 12 converts the driving pattern data into a driving signal having a level corresponding to the driving pattern data. A laser controller 13 controls the semiconductor laser unit 10 based on the driving signal supplied from the digital-analog converter 12. The semiconductor laser unit 10 emits a laser beam which is modulated in accordance with the driving signal. The laser beam emitted from the semiconductor laser unit 10 is incident to a polygonal mirror 14 which rotates at a predetermined speed in a predetermined direction. The laser beam reflected by the polygonal mirror 14 passes through a f-θ lens 15 and is reflected by a mirror 16. Then the laser beam reflected by the mirror 16 is projected onto the surface of a photosensitive drum 21 provided in an electrophotography image forming unit 20. When the polygonal mirror 14 rotates, a laser beam spot on the surface of the photosensitive drum 21 moves in a direction parallel to an axis around which the photosensitive drum 21 rotates. That is, the laser beam scans the surface of the photosensitive drum 21 at a predetermined speed. In the electrophotography image forming unit 20, a well known electrophotography process is carried out so that an image is formed on a recording sheet.

The data processing circuit 11 carries out both pulse width modulation and beam intensity modulation so that driving pattern data is generated. A description will now be given of the principle of the above types of modulation, which is carried out by the data processing circuit 11, according to a first embodiment of the present invention.

Figure 2:
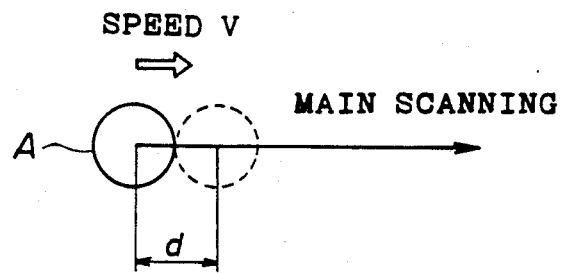
FIG. 2 is a diagram illustrating a laser beam spot formed on a photosensitive drum.
Figure 3:
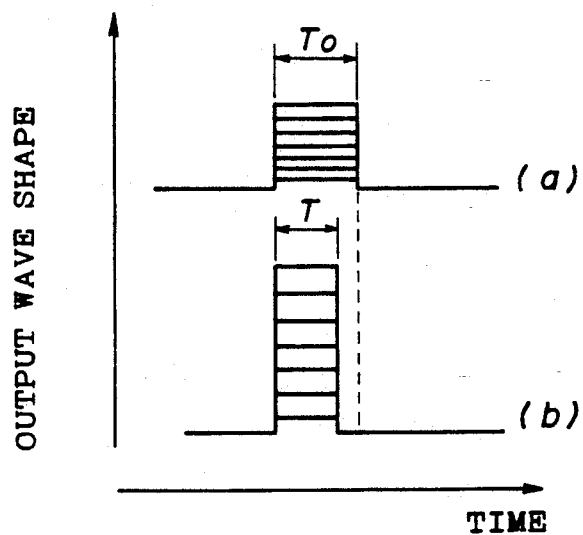
FIG. 3 is a diagram illustrating wave shapes of a driving pulse.

When a laser beam scans the surface of the photosensitive drum 21, the laser beam spot A moves at a speed V in a main scanning direction parallel to the axis around which the photosensitive drum 21 rotates, as shown in FIG. 2. FIG. 3 shows an output wave shape of the driving signal for the semiconductor laser beam 10. In FIG. 3(a), the pulse width $T_o$ of the driving signal corresponds to an interval d between adjacent dots. In this case, a duty cycle of the driving signal is 100%. The pulse width $T_o$ in a case where the duty cycle of the driving signal is 100% is defined as follows:

$$T_o = d/V$$

where d denotes a pixel pitch which is an interval between adjacent dots and V denotes a scanning speed in the main scanning direction. The above pixel pitch is equal to a reciprocal of a recording density which is an arrangement rate of dots formed on a recording medium. In FIG. 3(b), the pulse width T of the driving signal is smaller than the above value $T_o$. In this case, the duty cycle of the driving signal is less than 100%. In this first embodiment, the semiconductor laser unit 10 is driven by the driving signal, in which the pulse width T is less than $T_o$, corresponding to the duty cycle of 100%. That is, the size of each dot in a sub scanning direction is less than the pixel pitch. Then the intensity of the driving signal having the pulse width T ($<T_o$) is controlled in accordance with the image data.

Figure 4:
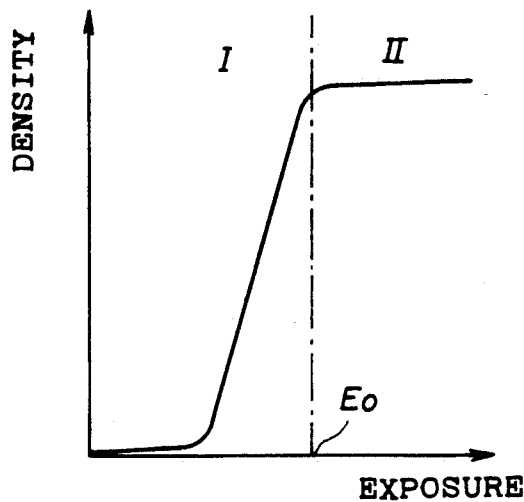
FIG. 4 is a graph illustrating a relationship between the amount of exposure on the surface of the photosensitive drum and the density of an image.
Figure 5:
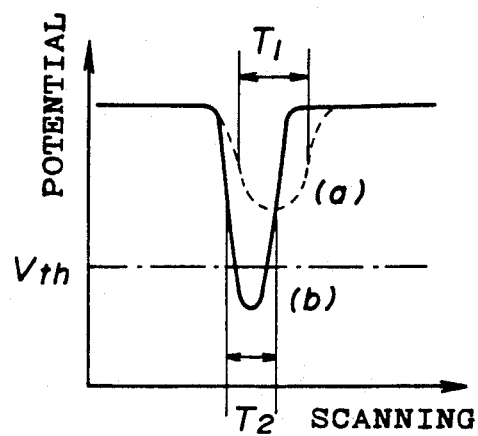
FIG. 5 is a diagram illustrating an electrical potential on the surface of the photosensitive drum.
Figure 6:
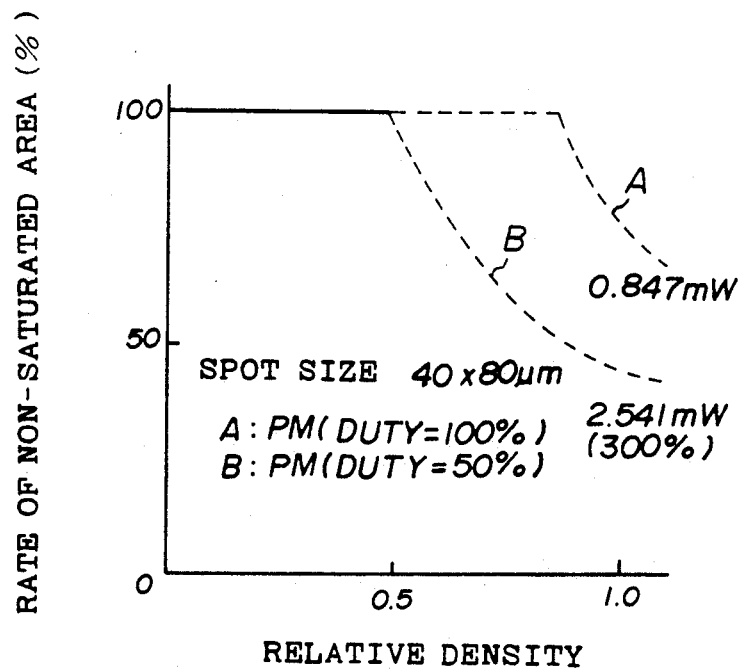
FIG. 6 is a graph illustrating a relationship between a relative density and a rate of a non-saturated area.

FIG. 4 shows a relationship between the amount of exposure on the surface of the photosensitive drum 21 and the density of an image formed in accordance with an electrophotography process. Referring to FIG. 4, in a region where the amount of exposure is less than $E_o$, the density of the image increases in accordance with the amount of exposure. This region is often referred to as a non-saturated region I. In a region where the amount of exposure is equal to or greater than $E_o$, the density of the image is not changed even if the amount of exposure increases. This region is often referred to as a saturated region II. In a case where a constant density for a dot is obtained, when the pulse width of the driving signal for the semiconductor laser unit 10 decreases, the intensity of the laser beam (the amount of exposure) must be increased. Thus, as shown in FIG. 5, when the pulse width of the driving signal decreases from $T_1$ to $T_2$, the electric potential distribution for the dot on the surface of the photosensitive drum 21 becomes a sharp drop shape, and a peak level thereof decreases. Then, when the potential level is less than a threshold level $V_{th}$, the density for the dot developed by toner is saturated (the saturated region II). That is, when the potential curve becomes the sharp drop shape and the peak level thereof decreases, a rate of an area where the density is saturated in the dot increases. FIG. 6 shows a relationship between a relative density and a rate of a non-saturated area where the density is not saturated in one dot in cases when the duty cycles of the driving signal for the semiconductor laser unit 10 are 50% and 100%. In FIG. 6, a curve A denotes a relationship in a case where the duty cycle of the driving signal is 100%, and a curve B denotes a relationship in a case where the duty cycle of the driving signal is 50%. When the rate of the non-saturated area in one dot decreases, the electric potential curve of one dot on the photosensitive drum 21 becomes sharper so that the amount of toner for one dot which is definitely adhered to the surface of the photosensitive drum 21 increases. Thus, when the duty cycle of the driving signal decreases from 100%, the reproducibility of the density for one dot is improved, specifically in a case where low density dots are formed.

Figure 7:
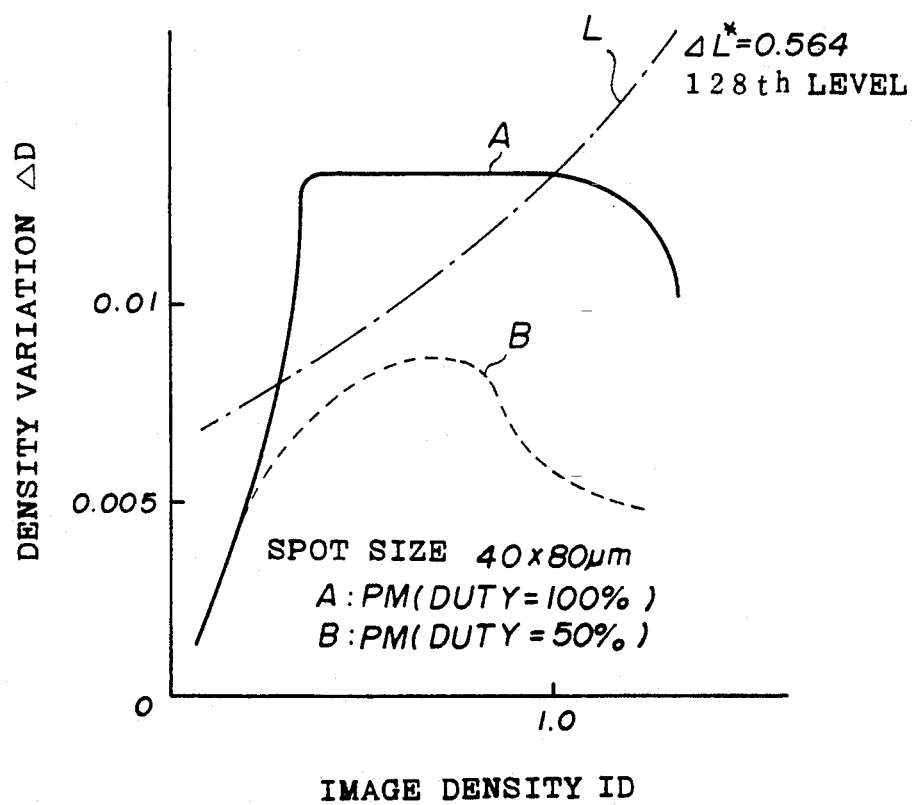

In addition, when the duty cycle of the driving signal for the semiconductor laser unit 10 is controlled at a value less than 100%, the overlapped area where the adjacent dots overlap each other is small. Thus, even if the rotation speed of the photosensitive drum 21 varies, there is little variation in the density of an image formed of a plurality of dots. FIG. 7 shows a density variation $\Delta D$ which is generated due to the variation of the rotation speed of the photosensitive drum 21 and the like. In FIG. 7, a curve A denotes a characteristic of the density variation in a case where the duty cycle of the driving signal is 100%, and a curve B denotes a characteristic of the density variation in a case where the duty cycle of the driving signal is 50%. A lined indicated by a one dotted line L denotes a metric lightness line. That is, in an area under the metric lightness line, the density variation can not be recognized, and in an area over the metric lightness line the density variation can be recognized. Thus, in the case where the duty cycle of the driving signal is 50%, the density variation can not be recognized.

As has been described above, when the duty cycle of the driving signal is less than 100% and the intensity of the laser beam is modulated in accordance with the image information, a high quality image in which there is little variation in the density and the reproducibility of the low density dots is improved can be obtained.

In a case where the duty cycle of the driving pulse is too small, even if the intensity of the laser beam is increased, it is difficult to obtain dots each having a density greater than a predetermined value. Thus, in a second embodiment of the present invention, the duty cycle of the driving signal is changed in accordance with the image information.

A description will now be given of the principle of laser beam modulation according to the second embodiment of the present invention.

Figure 8:
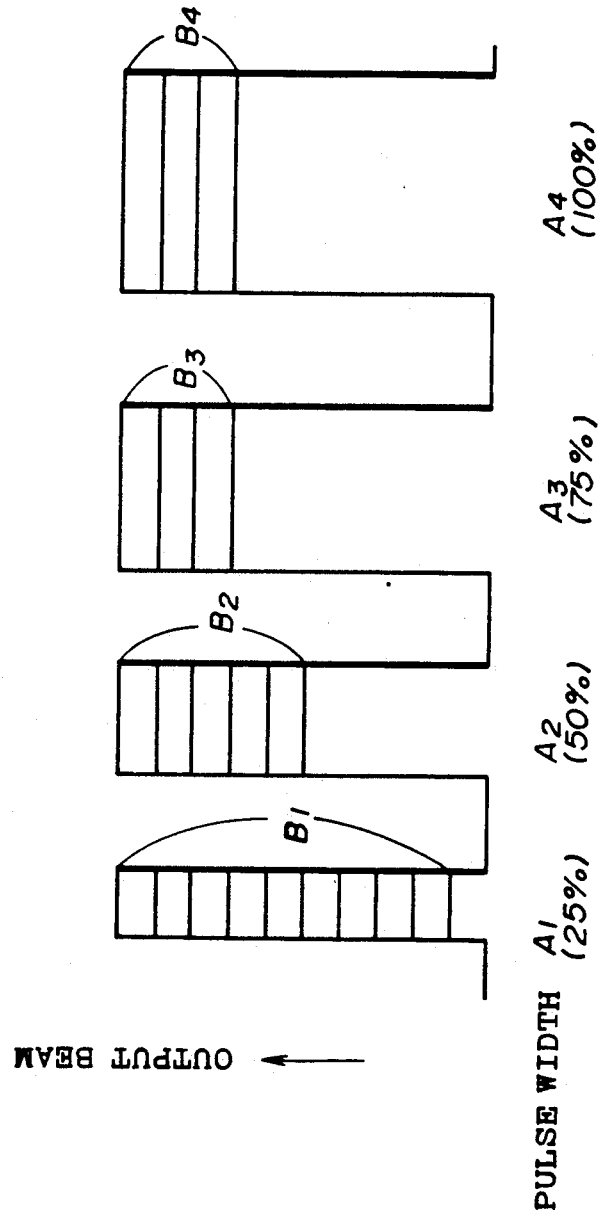
FIG. 8 is a diagram illustrating the principle of laser beam modulation according to the second embodiment of the present invention.

FIG. 8 shows the principle of laser beam modulation according to the second embodiment. In FIG. 8, when the duty cycle of the driving signal is 25% ($A_1$), the intensity of the laser beam is controlled in a range of $B_1$ in accordance with the image information, when the duty cycle of the driving signal is 50% ($A_2$), the intensity of the laser beam is controlled in a range of $B_2$ in accordance with the image information, when the duty cycle of the driving signal is 75% ($A_3$), the intensity of the laser beam is controlled in a range of $B_3$ in accordance with the image information, and when the duty cycle of the driving signal is 100% ($A_4$), the intensity of the laser beam is controlled in a range of $B_4$ in accordance with the image information. Then the duty cycle of the driving signal and the intensity of the laser beam are selected based on the image information for each dot. For example, one of the above four duty cycles—25%, 50%, 75% and 100%—is selected in accordance with the density data for each dot, and the intensity of the laser beam is controlled in accordance with the same density data.

Figure 9:
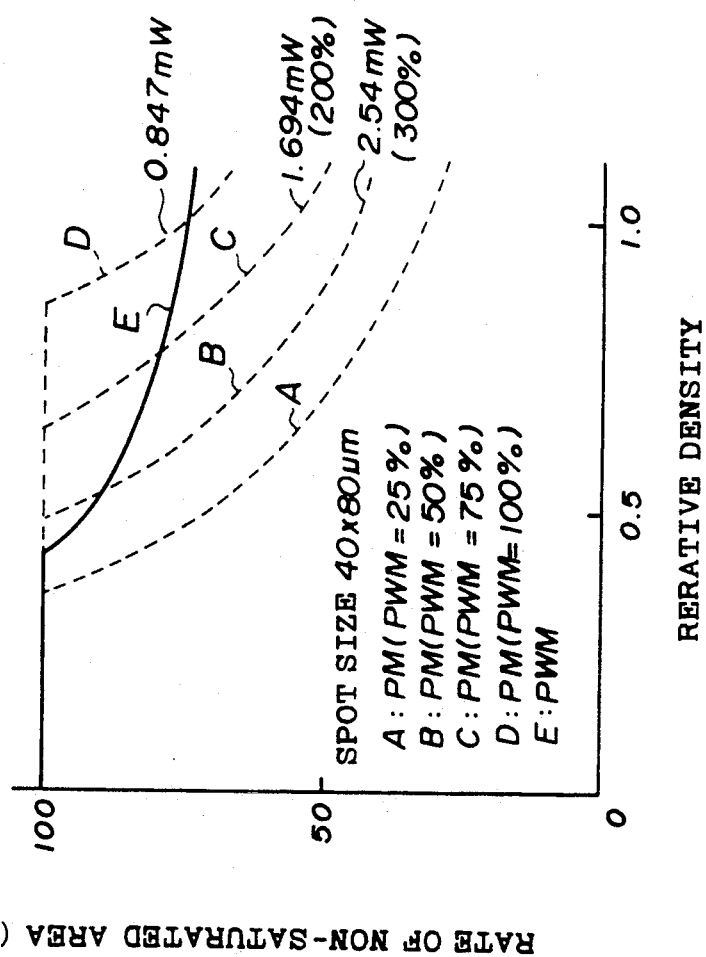
FIG. 9 is a graph illustrating a relationship between the relative density and the rate of the non-saturated area.

FIG. 9 shows a relationship between a relative density and a rate of a non-saturated area where the density is not saturated in one dot in cases where the duty cycles of the driving signal for the semiconductor laser unit 10 are 25%, 50%, 75% and 100%. In FIG. 9, a curve A denotes a relationship in a case where the duty cycle of the driving signal is 25%, a curve B denotes a relationship in a case where the duty cycle of the driving signal is 50%, a curve C denotes a relationship in a case where the duty cycle of the driving signal is 75%, a curve D denotes a relationship in a case where the duty cycle of the driving signal is 100%, and a curve E denotes a relationship in a case where only the pulse width modulation is carried out.

In the second embodiment, the modulation of the laser beam is carried out as follows.

In a case where the relative density is less than 0.6, the duty cycle of the driving signal is determined as being 25% and the intensity of the laser beam is controlled within a range of $B_1$ in accordance with the density data in each dot. The duty cycle of the driving signal is switched from 25% to 50% at the relative density of 0.6, then in a case where the relative density is less than 0.8, the duty cycle of the driving signal is maintained at 50% and the intensity of the laser beam is controlled within a range of $B_2$. Further, the duty cycle of the driving signal is switched from 50% to 75% at the relative density of 0.8, then in a case where the relative density is less than 1.1, the duty cycle of the driving signal is maintained at 75% and the intensity of the laser beam is controlled within a range of $B_3$. When the relative density is equal to or greater then 1.1, the duty cycle of the driving signal is determined as being 100% and the intensity of the laser beam is controlled within a range of $B_4$.

The pulse modulation in which the duty cycle is changed in accordance with the relative density and the beam intensity modulation in which the intensity of the laser beam is controlled in accordance with the relative density are carried out as described above, so that the density of each dot can be controlled in a state where the rate of the non-saturated area in one dot is relatively small and the dot size is relatively large. Thus, a high quality image in which there is little variation in the density and the reproducibility of the low density dots is improved can be obtained.

The semiconductor laser 10 is controlled so that a controlling speed in the light-electricity negative feedback loop is 10 nsec. In this case, the intensity of the laser beam can be correctly controlled at the writing clock of 20 MHz.

Figure 10:
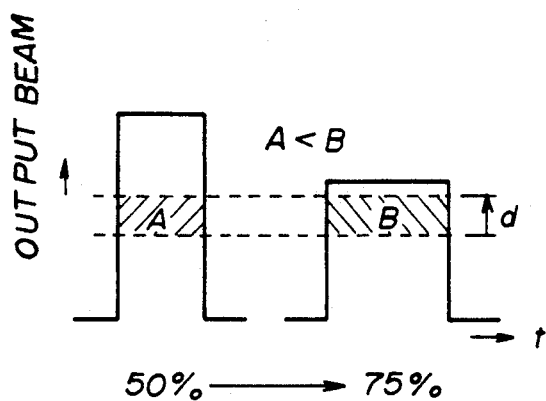
FIG. 10 is a diagram illustrating the wave shapes of the driving signal in cases where the duty cycles of the driving signal are 50% and 75%.
Figure 11:
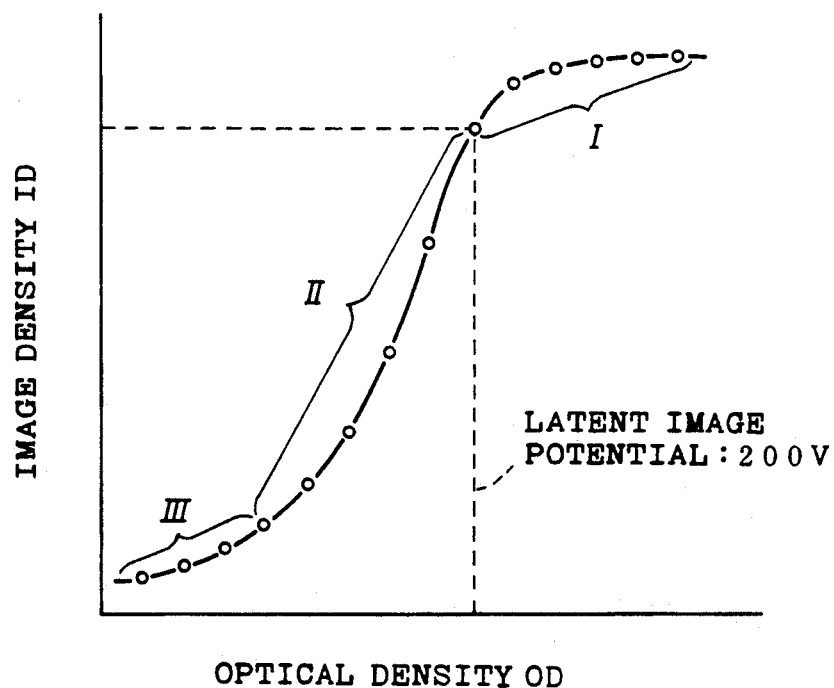
FIG. 11 is a graph illustrating a relationship between the optical density OD and the image density ID.

In a $\gamma$-characteristic of the photosensitive drum 21, a first region where the density variation with respect to the exposure energy variation on the photosensitive drum 21 is small and a second region where the density variation with respect to the exposure energy variation on the photosensitive drum 21 is large. In addition, when a developing bias varies in a developer unit, the density of an image also varies For example, as shown in FIG. 10, the density variation A with respect to the developing bias variation d in a case where the duty cycle of the driving signal is 50% is less than the density variation B in a case where the duty cycle of the driving signal is 75%. In a case where the photosensitive drum 21 has the γ-characteristic in which the density variation with respect to the exposure energy variation is large in a density required for an image and the developing bias variation is large, when the duty cycle is switched from 50% to 75%, the density of an image can decrease or greatly increase. To decrease the density variation when the duty cycle of the driving signal is changed, it is preferable that the duty cycle of the driving signal be changed at a density in the above first region where the density variation with respect to the exposure energy variation is small in the γ-characteristic of the photosensitive drum 21. In a γ-characteristic shown in FIG. 11, there is the first region I in which the density variation with respect to an optical density variation corresponding to the exposure energy variation is small, the second region II in which the density variation with respect to the optical density variation is large, and a high light region III in which the density of the image is low. In this case, it is preferable that the duty cycle of the driving signal be changed in the first region I of the γ-characteristic in which an electric potential of a latent image formed by the laser beam on the photosensitive drum 21 is equal to or less than 200 v, so that a high quality image is obtained. In addition, if the density variation with respect to the optical density variation is small in the high light region III, it is possible to switch the duty cycle of the driving signal at a density in the high light region III.

Figure 12:
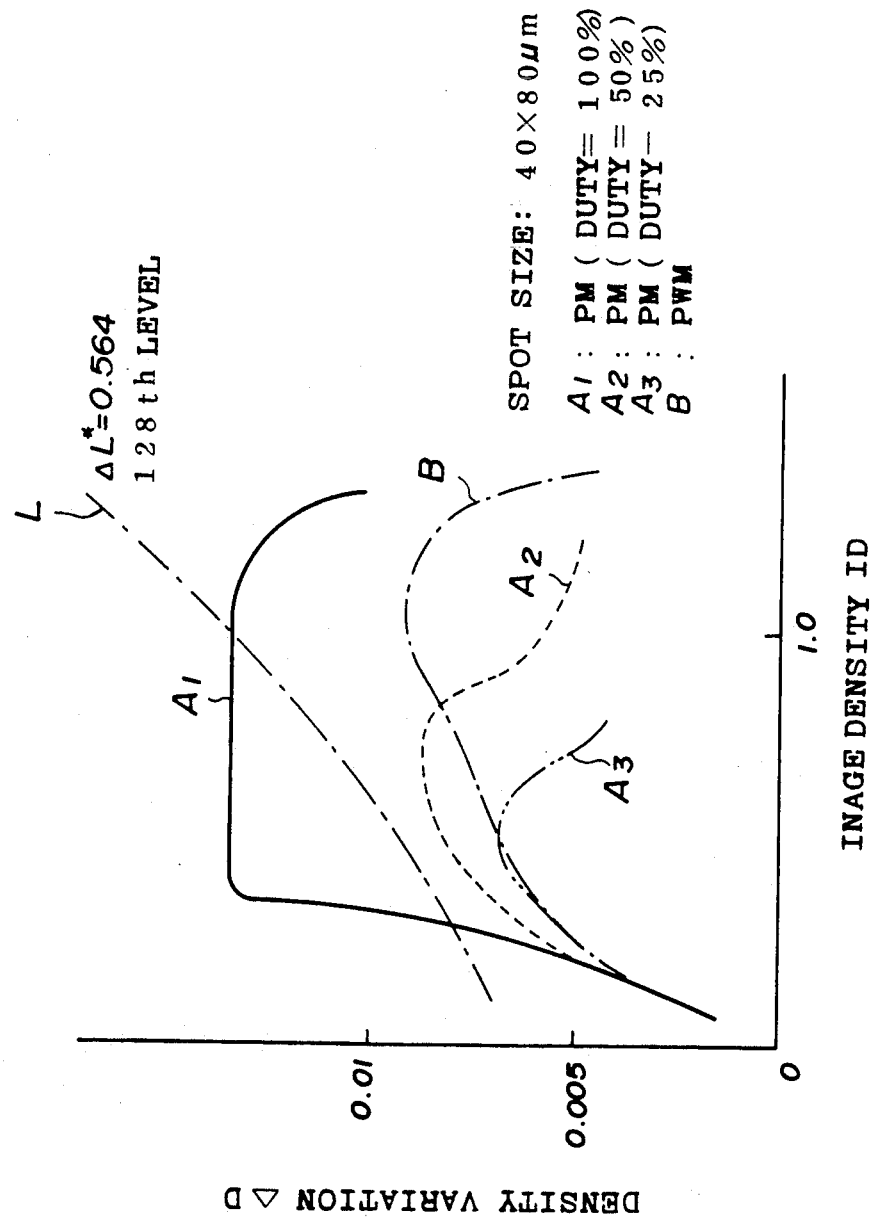

FIG. 12 shows a density variation $\Delta D$ which is generated due to the variation of the rotation speed of the photosensitive drum 21 and the like. In FIG. 12, a curve $A_1$ denotes a characteristic of the density variation in a case where the duty cycle of the driving signal is 100%, a curve $A_2$ denotes a characteristic of the density variation in a case where the duty cycle of the driving signal is 50%, a curve $A_3$ denotes a characteristic of the density variation in a case where the duty cycle of the driving signal is 25%, and a curve B denotes a characteristic of the density variation in a case where only the pulse width modulation is carried out. When the image density (ID) increased, the density variation $\Delta D$ decreases in each of the characteristics $A_1$, $A_2$ and $A_3$. This indicates that it is preferable that the duty cycle of the driving signal be switched at a high image density in the first region I in which the density variation with respect to the exposure energy variation (the optical density variation) is small.

In the above second embodiment, one duty cycle is selected from a plurality of the duty cycles which have been previously determined, based on the image information such as the image density. The duty cycle of 100% is included in the duty cycles which have been previously determined in the above second embodiment. But it is also possible for each of the duty cycles which have been previously determined to be less than 100%. In this case, the non-saturated area in one dot in a high density region where the image density is, for example, equal to or greater than 1.1 is smaller than that in the above second embodiment.

Figure 13:
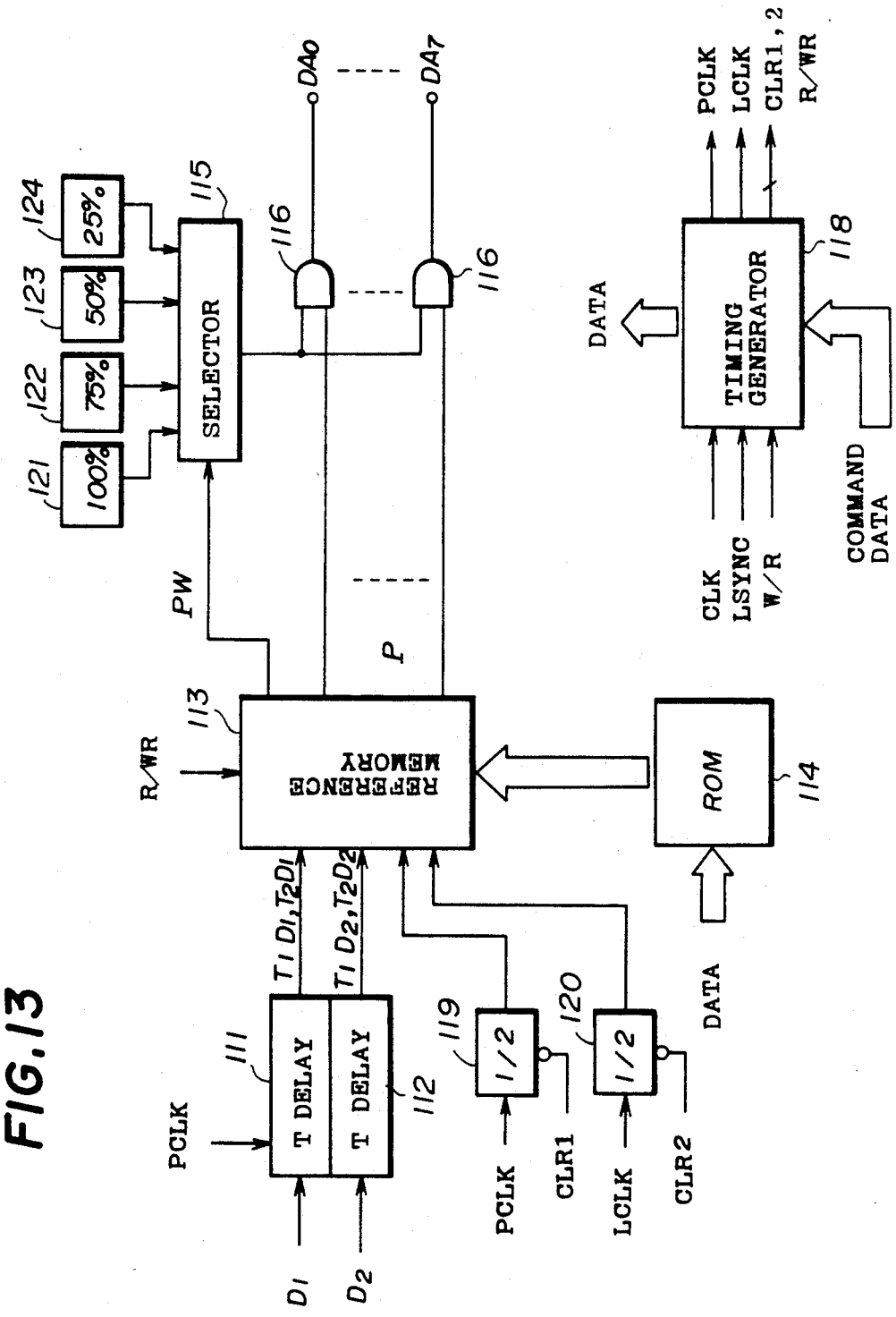
FIG. 13 is a block diagram illustrating an example of the data-processing circuit shown in FIG. 1.
Figure 14:
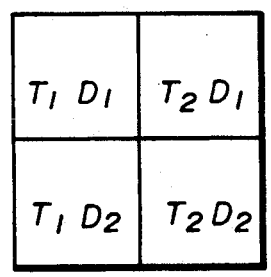
FIG. 14 is a diagram illustrating an example of image information supplied to the reference memory shown in FIG. 13.

FIG. 13 shows an example of the data processing circuit 11. Referring to FIG. 13, a delay circuit 111 delays image data $D_1$ for each dot in a line in synchronism with a clock signal PCLK. A delay circuit 112 delays image data $D_2$ for each dot in the next line in synchronism with the clock signal PCLK. As a result, four image data $T_1D_1$, $T_2D_1$, $T_1D_2$ and $T_2D_2$ which are arranged in a 2×2 dot matrix shown in FIG. 14 are supplied from the delay circuits 111 and 112 to a reference memory 113. The four image data are used as address information of the reference memory 113. A look-up table for converting the four image data into intensity data P and a pulse width selecting data PW is stored in the reference memory 113. The look-up table is previously stored in a ROM 114, and then the look-up table is supplied from the ROM 114 to the reference memory 113. In the look-up table, the intensity data P corresponds to the intensity of the laser beam emitted from the semiconductor laser unit 10. A first oscillator 121 outputs a first signal having a duty cycle of 100%. A second oscillator 122 outputs a second signal having a duty cycle of 75%. A third oscillator 123 outputs a third signal having a duty cycle of 50%. A fourth oscillator 124 outputs a fourth signal having a duty cycle of 25%. A selector 115 selects one of the four signals output respectively from the oscillators 121, 122, 123 and 124 based on the pulse width selecting data PW supplied from the reference memory 113 and outputs the selected signal. Each bit of the intensity data P output from the reference memory 113 is supplied to each corresponding AND gate 116 to which the selected signal output from the selector 115 is supplied so that the driving pattern data which is formed of bits $DA_0$, $DA_1$, ..., $DA_7$ output from AND gates 116 is obtained. This driving pattern data is converted into the driving signal by the digital-analog convertor 12, and the driving signal has a level corresponding to the intensity data P and the duty cycle equal to that of the selected signal output from the selector 115.

A first ½ frequency divider 119 divides the clock signal PCLK in synchronism with a clock CLR 1 and outputs a first position signal. A second ½ frequency divider 120 divides a clock signal LCLK in synchronism with a clock CLR 2 and outputs a second position signal. The first position signal and the second position signal respectively denote a position of each dot in the 2×2 dot matrix shown in FIG. 14. A timing generator 118 inputs a master clock signal, a signal LSYNC which denotes one line in a scanning direction, a master read/write signal and command data, and outputs the clock signals PCLK and LCLK, the clocks CLR 1 and CLR 2 and a read/write signal for the reference memory 113.

In the above first embodiment in which the duty cycle of the driving signal is determined as being a value less than 100%, such as 50%, the intensity of the laser beam is controlled in accordance with the image information, the look-up table stored in the reference memory is defined so that the third signal having a 50% duty cycle is always selected with respect to any image information and the intensity data corresponds to the image data in the 2×2 dot matrix as shown in FIG. 14.

In the above second embodiment in which the duty cycle of the driving signal is selected from a plurality of the duty cycles based on the image information, and the intensity of the laser beam is controlled in accordance with the image information, the look-up table stored in the reference memory 113 is defined so that the selected signal output from the selector 115 is changed in accordance with the image data in the 2×2 dot matrix as shown in FIG. 14 and the intensity of the laser beam is controlled in accordance with the image data.

Figure 15:
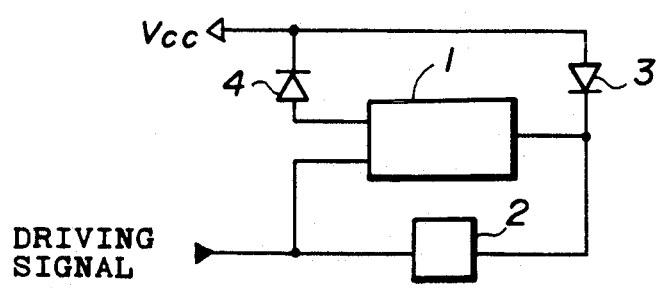
FIG. 15 is a block diagram illustrating an example of the laser controller shown in FIG. 1.

FIG. 15 shows an example of the laser controller 13.

Referring to FIG. 15, a semiconductor laser element 3 emits a laser beam, and a part of the laser beam emitted from the semiconductor laser element 3 is incident to a photoelectric conversion element 4. The driving signal having a level corresponding to the image information for each dot is supplied from the digital-analog converter 12 to a comparator 1 and a voltage-current converter 2. The comparator 1, the semiconductor laser element 3 and the photoelectric conversion element 4 form the light-electricity negative feed back loop. A light signal proportional to a current generated in the photoelectric conversion element 4 and the driving signal are compared with each other by the comparator 1. Then a forward current of the semiconductor laser element 3 is controlled on the basis of a comparison result of the comparator 1 so that the level of the above light signal becomes equal to the level of the driving signal. In addition, the voltage-current converter 2 outputs a current corresponding to the level of the driving signal. A conversion coefficient in the voltage-current converter 2 is defined on the basis of a characteristic between an output beam level of the semiconductor laser element 3 and the forward current thereof, a coupling coefficient between the photoelectric conversion element 4 and the semiconductor laser element 3, and a characteristic between a received light level of the photoelectric conversion element 4 and the level of the light signal thereof. A current, which is the sum of an output current from the voltage-current converter 2 and a control current output from the comparator 1, becomes the forward current of the semiconductor laser element 3.

In a case where a crossover frequency in the above light-electricity negative feed back loop is defined as $f_o$ and a DC gain thereof is defined as 10000, a step response characteristic of an optical output $P_{out}$ of the semiconductor laser element 3 is approximately represented as follows.

$$P_{out} = PL + (PS - PL) \exp(-2\pi f_o t)$$

where PL denotes an optical output level at $t = \infty$, and PS denotes the amount of light set in the voltage-current convertor 2.

As the DC gain of the light-electricity negative feed back loop in a state of an open loop is defined as 100000, PL can be equal to the amount of light set in the voltage-current convertor 2 in a case where an error equal to or less than 0.1% is permitted at a time of setting the amount of light. Thus, in a case where the amount of light PS set in the voltage-current converter 2 is equal to PL, the optical output of the semiconductor laser element 3 becomes equal to PL immediately. Even if PS varies by 5% due to a disturbance and the like, an error in the optical output of the semiconductor laser element 3 with respect to a value which has been previously set is equal to or less than 0.4% at the crossover frequency $f_o$ of 40 MHz.

When the laser beam scans the surface of the photosensitive drum 21, the photosensitive drum 21 rotates at a predetermined speed in a predetermined direction. In this case, the laser beam spot formed on the surface of the photosensitive drum 21 moves in a main scanning direction parallel to the axis around which the photosensitive member 21 rotates so that a main scanning is carried out. At the same time, the laser beam spot moves in a sub scanning direction perpendicular to the main scanning direction so that a sub scanning is carried out. A method for representing the image density by use of a dot matrix has been proposed. In this method, the dot matrix in which m dots are arranged in the main scanning direction and n dots are arranged in the sub scanning direction.

The above second embodiment in which the duty cycle of the driving signal for each dot is selected from a plurality of the duty cycles based on the image information and the intensity of the laser beam is controlled in accordance with the image information can be applied to each dot in the dot matrix.

Figure 16:
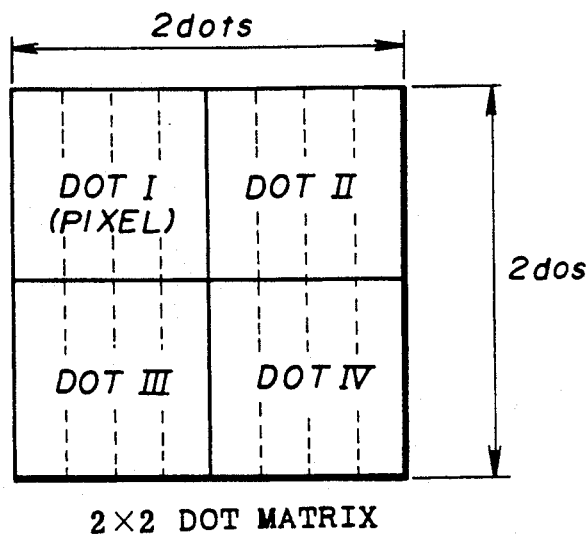
FIG. 16 is a diagram illustrating an example of a $2 \times 2$ dot matrix.
Figure 17:
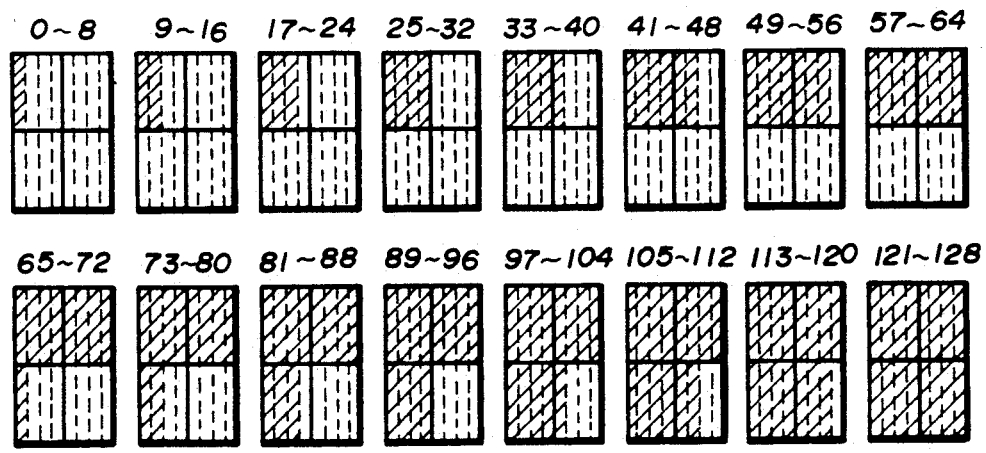
FIGS. 17 and 18 are diagrams illustrating examples of a pulse width modulation and a beam intensity modulation for each dot in the $2 \times 2$ dot matrix shown in FIG. 16.
Figure 18:
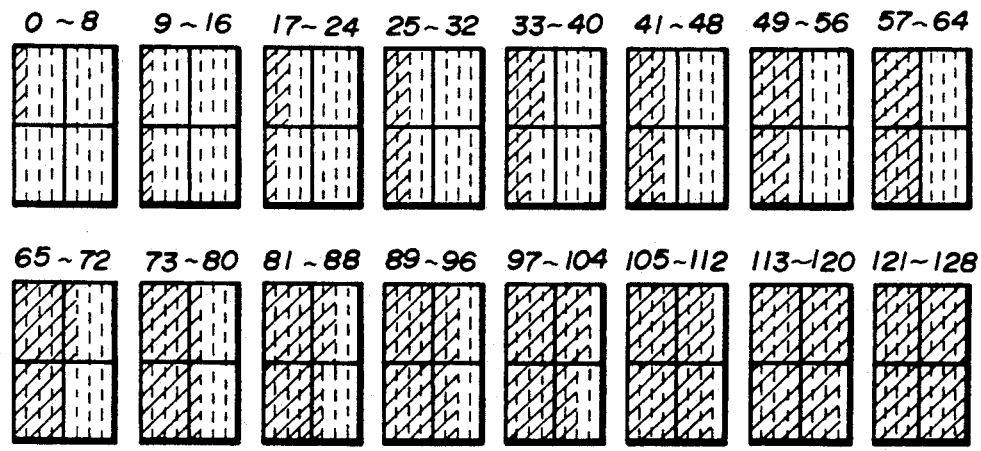

FIG. 16 shows a 2×2 dot matrix in which 2 dots are arranged in the main scanning direction and 2 dots are arranged in the sub scanning direction. In the 2×2 dot matrix shown in FIG. 16, the duty cycle of the driving signal is changed in accordance with the density level, for example, as shown in FIG. 17 or FIG. 18. For example, in the first dot (pixcel) I positioned left upper in the 2×2 matrix shown in FIG. 17, when the density level is equal to or less than the 8th level, the duty cycle is 25%, when the density level is in a range between the 9th level and the 16th level, the duty cycle of the driving signal is 50%, when the density level is in a range between the 17th level and the 24th level, the duty cycle of the driving signal is 75%, and when the density level is in a range between the 25th level and the 32th level, the duty cycle of the driving signal is 100%. In FIG. 17, when the density level is equal to or less than the 64th level, a dot adjacent to an exposed dot in the sub scanning direction is not exposed.

Figure 19:
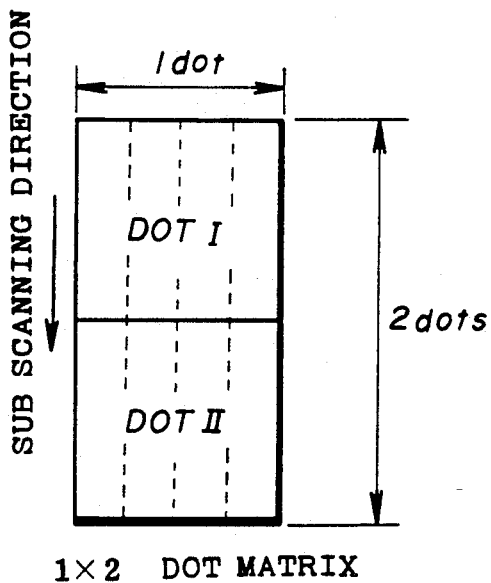
FIG. 19 is a diagram illustrating an example of a $1 \times 2$ dot matrix.
Figure 20:
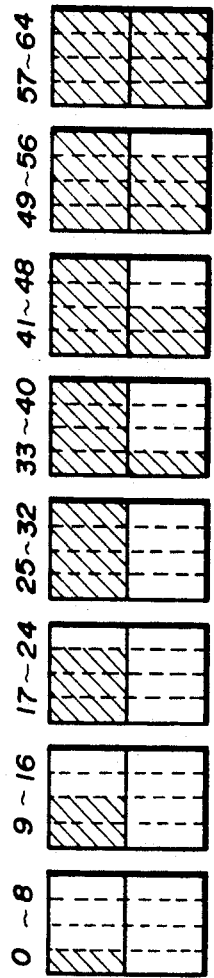
FIG. 20 is a diagram illustrating an example of the pulse modulation and the beam intensity modulation of each dot in the $1 \times 2$ dot matrix.

In a case where a gradational (density) level is represented by use of a 1×2 dot matrix shown in FIG. 19, the duty cycle of the driving signal corresponding to each dot is, for example, controlled in accordance with a pattern shown in FIG. 20.

Figure 21:
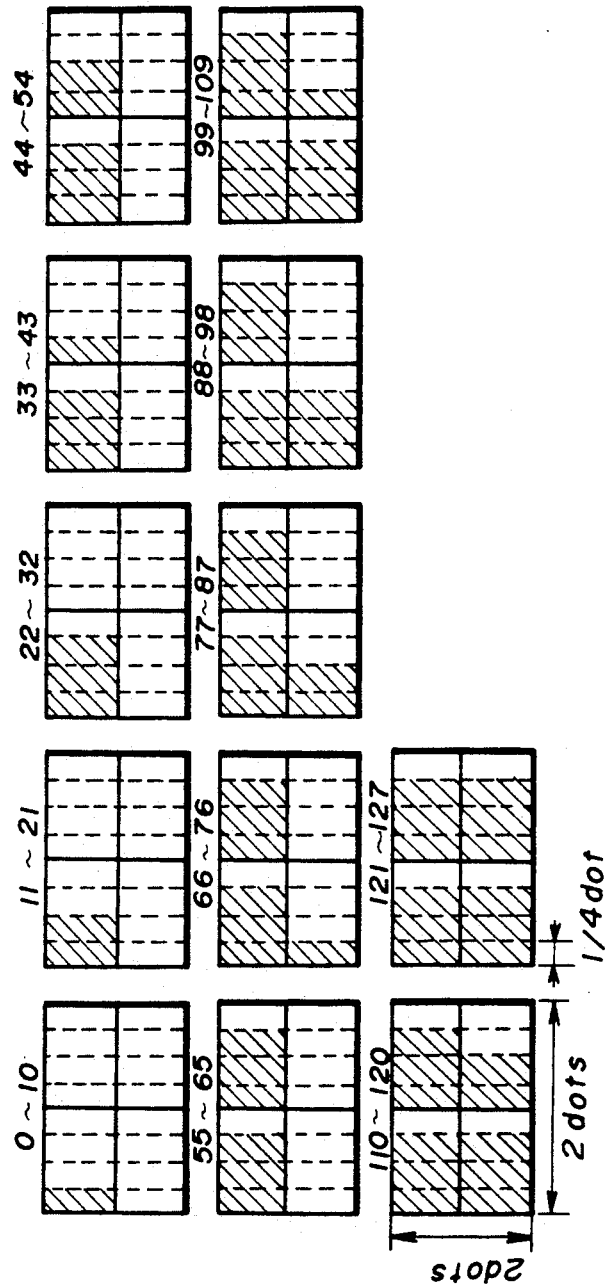
FIG. 21 is a diagram illustrating an example of the pulse modulation in which the duty cycle of the driving signal is less than 100% and the beam intensity modulation for each dot in the $2 \times 2$ dot matrix shown in FIG. 16.

In addition, in a case where a gradational level is represented by use of the 2×2 dot matrix as shown in FIG. 16, the duty cycle of the driving signal corresponding to each dot can also be controlled in accordance with a pattern shown in FIG. 21. In this case, the duty cycle of the driving signal is less than 100%.

The above relationship between the gradational level (the density) and an exposing pattern in the dot matrix as shown in FIG. 17, 18, 20 or 21 is stored in the reference memory 113 of the data processing circuit 11. Thus, the pulse width modulation and the beam intensity modulation can be carried out in accordance with the pattern as shown in FIG. 17, 18, 20 or 21.

A description will now be given of the principle of the third embodiment of the present invention. In the third embodiment of the present invention, at least either the pulse modulation or the beam intensity modulation is carried out for each dot in the dot matrix.

Figure 22C:
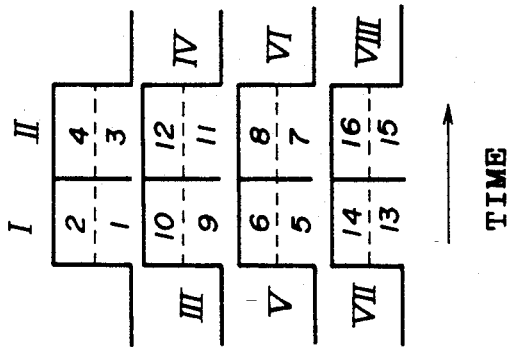
FIG. 22C is a diagram illustrating an example of the beam intensity modulation in the $2 \times 4$ dot matrix shown in FIG. 22A.
Figure 22B:
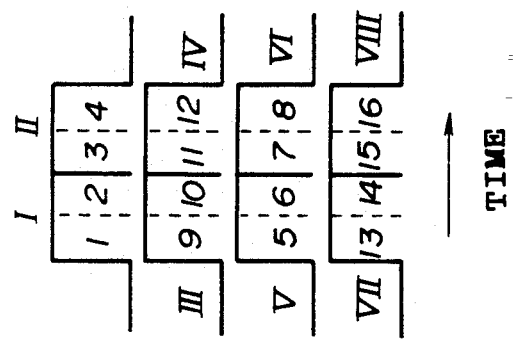
FIG. 22B is a diagram illustrating an example of the pulse width modulation in the $2 \times 4$ dot matrix shown in FIG. 22A.
Figure 22A:
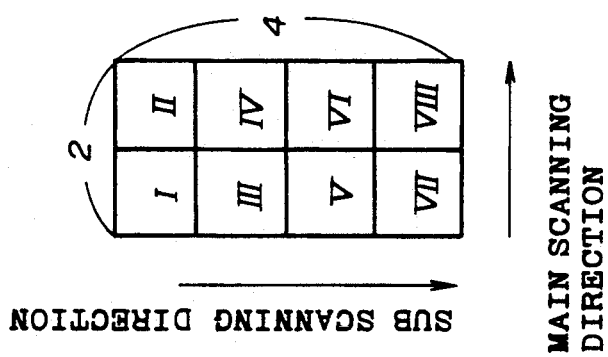
FIG. 22A is a diagram illustrating an example of a $2 \times 4$ dot matrix.

FIG. 22A shows an example of the dot matrix. In the dot matrix shown in FIG. 22A, 2 dots are arranged in the main scanning direction and 4 dots are arranged in the sub scanning direction. This type of dot matrix is often referred to as a 2×4 dot matrix. In a case where 16 gradational levels can be represented by the pulse width modulation for each dot in the 2×4 matrix, the pulse width corresponding to each dot in the 2×4 matrix is controlled in accordance with the gradational level, as shown in FIG. 22B. For example, in a case where the fifth gradational level is represented, the pulse width of the driving signal is controlled so that the duty cycle for the dots I and II is 100%, the duty cycle for the dot V is 50% and the remaining dots in the 2×4 matrix are not exposed. In this case, when the gradational level equal to or less than the eighth gradational level is represented, a dot adjacent to an exposed dot in the sub scanning direction is not exposed. In a case where 16 gradational levels can be represented by the beam intensity modulation for each dot in the 2×4 matrix, the intensity of the laser beam corresponding to each dot in the 2×4 matrix is controlled in accordance with the gradational level, as shown in FIG. 22C. For example, in a case where the fifth gradational level is represented, the intensity of the laser beam for the dots I and II is controlled so as to be the maximum value, the intensity of the laser beam for the dot V is controlled so as to be half of the maximum value and the remaining dots in the 2×4 matrix are not exposed. In this case, when the gradational level equal to or less than the eighth gradational level is represented, a dot adjacent to an exposed dot in the sub scanning direction is not exposed in the same manner as that in the pulse modulation as shown in FIG. 22B. That is, in the above cases of the pulse modulation for each dot in the 2×4 matrix shown in FIG. 22A and the beam intensity modulation for each dot in the 2×4 matrix shown in FIG. 22B, the dots in the 2×4 matrix are exposed so that the spatial frequency of an image in the sub scanning direction is the maximum.

Figure 23:
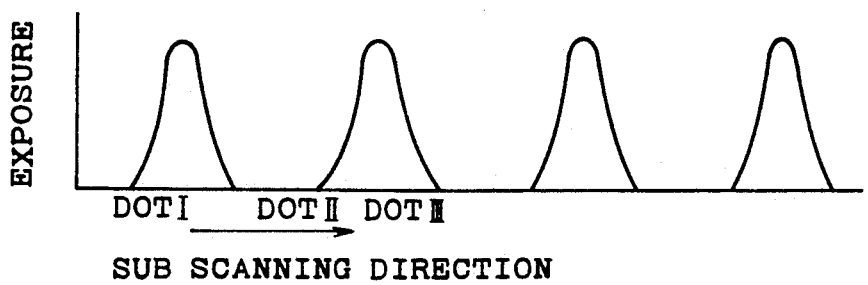
FIGS. 23 and 24 are diagrams illustrating the exposure distributions for each dot in the dot matrix.

In a case where the dots in the matrix are exposed so that the spatial frequency of the image in the sub scanning direction is the maximum, as has been described above, an exposure energy distribution in the sub scanning direction of the photosensitive member has, for example, a shape as shown in FIG. 23. That is, even if the intensity of the laser beam spot for each dot is distributed in a Gussian shape, the overlapped area where the adjacent dots overlap each other in the sub scanning direction can be as small as possible. Thus, even if the rotation speed of the photosensitive drum 21 varies, as the overlapped area is small, the variation of the amount of exposure in the sub scanning direction on the photosensitive drum 21 is small. Thus, an image in which the density variation in the sub scanning direction is small can be obtained.

Figure 24:
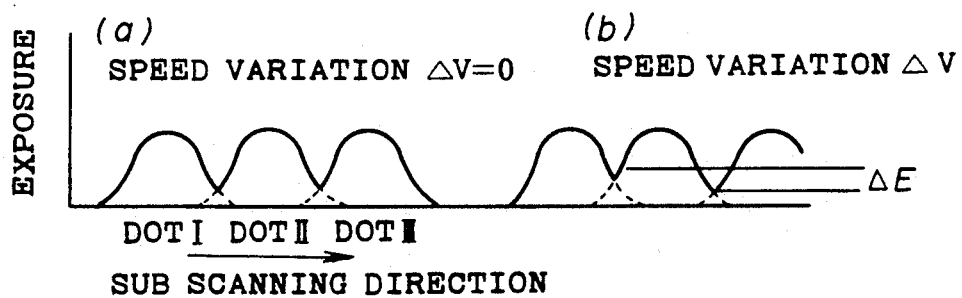

FIG. 24 shows a conventional exposure distribution in the sub scanning direction on the photosensitive drum 21. In this case, as the overlapped area where the adjacent dots overlap each other is large, when the rotation speed of the photosensitive drum 21 varies, the variation ΔE of the amount of exposure in the sub scanning direction of the photosensitive direction 21 is large. Thus, conventionally, the density variation in the sub scanning direction is easily generated on the image.

FIG. 25A shows an example of the dot matrix. In the dot matrix shown in FIG. 25A, one dot is arranged in the main scanning direction and 2 dots are arranged in the sub scanning direction. This dot matrix is often referred to as a 1×2 dot matrix. In a case where 8 gradational levels can be represented by the pulse width modulation for each dot in the 1×2 dot matrix, the pulse width of the driving signal for each dot in the 1×2 matrix is controlled in accordance with the gradational level, as shown in FIG. 25B. In a case where 8 gradational levels can be represented by the beam intensity modulation for each dot in the 1×2 dot matrix, the intensity of the laser beam for each dot in the 1×2 matrix is controlled in accordance with the gradational level, as shown in FIG. 25C. In the case of the 1×2 dot matrix, an image in which the density variation in the sub scanning direction is small can be obtained, in the same manner as that in the case of the above 2×4 dot matrix.

Figure 26:
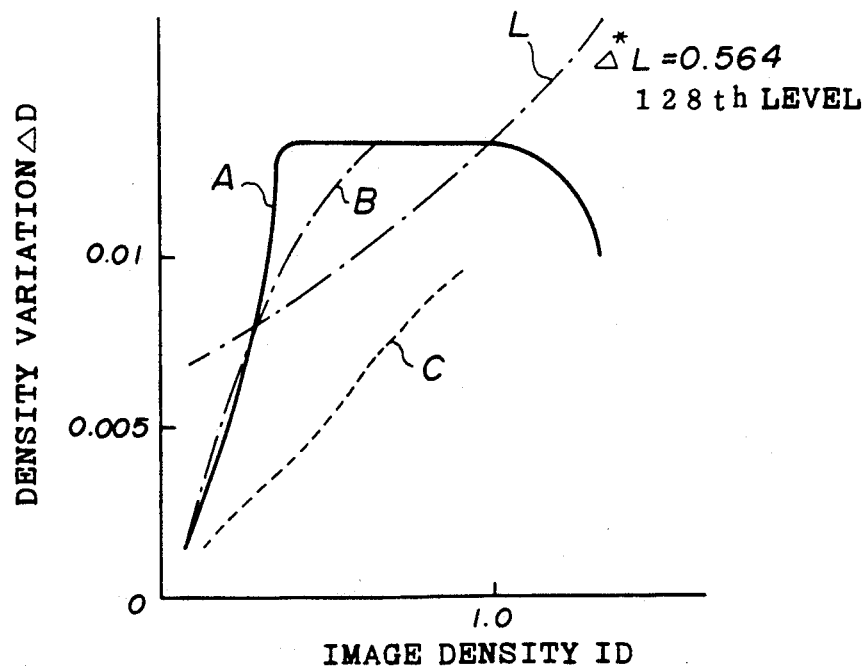

FIG. 26 shows a density variation ΔD which is generated due to the variation of the rotation speed of the photosensitive drum 21 and the like. In FIG. 26, a curve A denotes a characteristic of the density variation in a case where the beam intensity modulation is carried out for each dot, a curve B denotes a characteristic of the density variation in a case where the pulse width modulation is carried out for each dot, and a curve C denotes a characteristic of the density variation in a case where the gradational level is represented by use of the 1×2 dot matrix. Referring to FIG. 26, when the gradational level is represented by use of the 1×2 dot matrix (see the curve in FIG. 26), the density variation in a region where the density is relatively small can be decreased.

Figure 27:
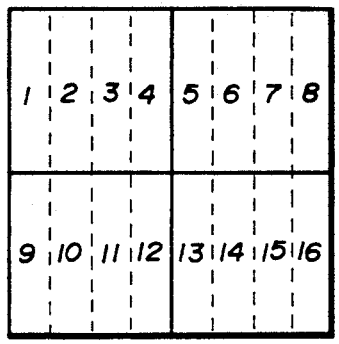
FIG. 27 is a diagram illustrating an example of the pulse width modulation in a $2 \times 2$ dot matrix.
Figure 28:
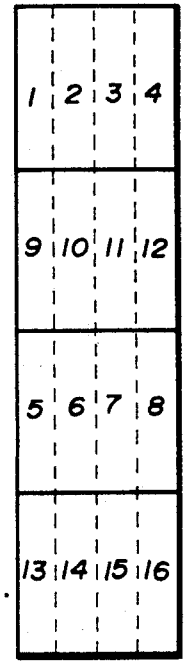
FIG. 28 is a diagram illustrating an example of the pulse width modulation in a $1 \times 4$ dot matrix.

FIG. 27 shows a case where the pulse width for each dot in a 2×2 dot matrix is controlled so that 16 gradational levels can be represented. FIG. 28 shows a case where the pulse width for each dot in a 1×4 dot matrix is controlled so that 16 gradational levels can be represented. In each of the cases shown in FIGS. 27 and 28, an image in which the density variation is small can be obtained in the same manner as that in the above cases shown in FIGS. 22A, 22B, 22C, 25A, 25B and 25C. In addition, both the pulse width modulation and the beam intensity modulation can also be carried out for each dot in the dot matrix.

It is also possible for the duty cycle of the driving signal, corresponding to each dot in the dot matrix, to be less than 100%.

Figure 29A:
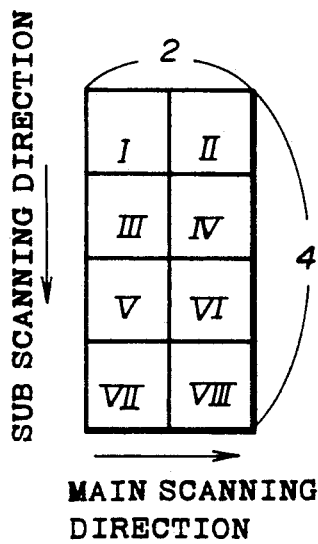
FIG. 29A is a diagram illustrating an example of a $2 \times 4$ dot matrix.
Figures 29B, 29C:
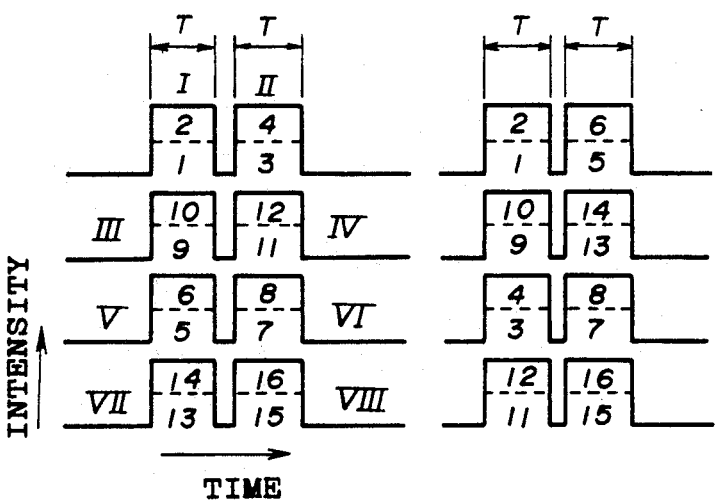
FIG. 29B is a diagram illustrating the pulse width modulation, in which the duty cycle of the driving signal is less than 100%, in the $2 \times 4$ dot matrix shown in FIG. 29A.
FIG. 29C is a diagram illustrating the beam intensity modulation under a condition where the duty cycle of the driving signal is less than 100% in the 2×4 dot matrix shown in FIG. 29A.

It is also possible for the intensity of the laser beam for each dot in the dot matrix to be controlled under a condition where the duty cycle of the driving signal, corresponding to each dot in the dot matrix, is less than 100%. In a case where 16 gradational levels can be represented by use of the 2×4 dot matrix as shown in FIG. 29A, the intensity of the laser beam for each dot in the 2×4 dot matrix is, for example, controlled in accordance with the gradational level under the condition where the duty cycle of the driving signal is less than 100%, as shown in FIG. 29A or FIG. 29C. In each of the cases shown in FIGS. 29A and 29B, the dots in the 2×4 matrix are exposed, in the same manner as those in the case of the 2×4 dot matrix shown in FIGS. 22A, 22B and 22C, so that the spatial frequency of the image in the sub scanning direction is the maximum.

In a case where the dots in the dot matrix are exposed so that the spatial frequency of the image in the sub scanning direction is the maximum, a relationship between the gradational level (the density) and an exposing pattern in each dot matrix is stored in the reference memory 113 of the data processing circuit 11. The above exposing pattern represents the pulse width of the driving signal for each dot in the dot matrix and/or the intensity of the laser beam for each dot in the dot matrix, as shown in FIGS. 22B, 22C, 25B, 25C, 27, 28, 29B or 29C. As a result, in the data processing circuit 11, the exposing pattern in the dot matrix corresponding to the image information supplied from the CPU is determined by the table in the reference memory 113, and then the driving pattern data corresponding to the exposing pattern is generated.

In a case where the gradational image is obtained by use of the dot matrix, the smoothness of the gradational image in an area where the density is constant is improved in comparison with that in a case where the gradational level for each dot is controlled so that the gradational image is obtained. However, the resolution of the gradational image formed by use of the dot matrix deteriorates. Thus, in a fourth embodiment of the present invention, means for forming the gradational image is switched between a first means for using the dot matrix and a second means for controlling the gradational level for each dot so that the gradational image is obtained.

A description will now be given of the fourth embodiment of the present invention.

Figure 30:
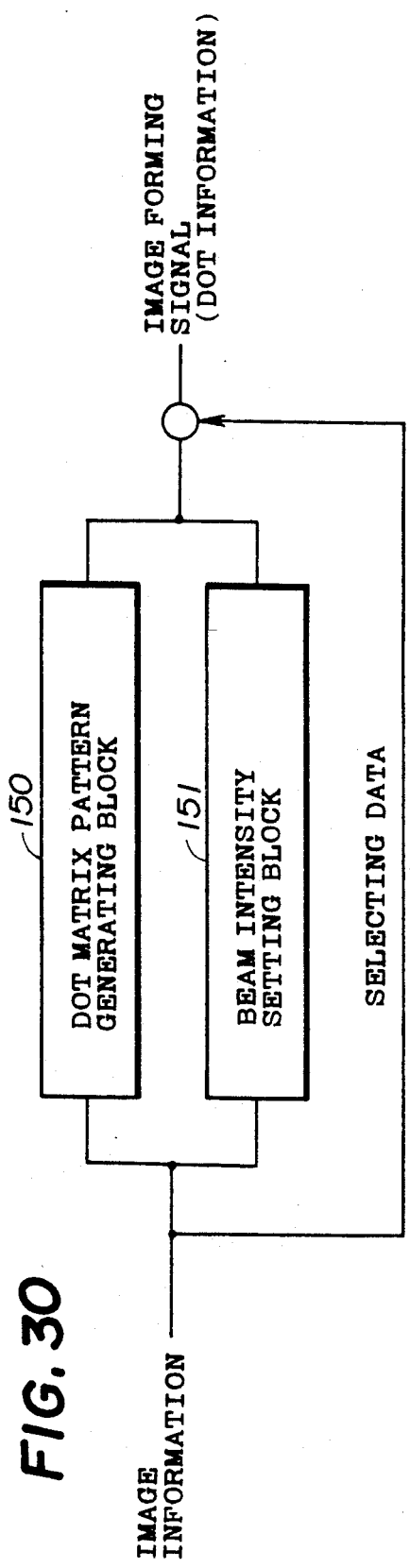
FIG. 30 is a block diagram illustrating the principle of a fourth embodiment of the present invention.

FIG. 30 shows the principle of the fourth embodiment of the present invention. Referring to FIG. 30, a dot matrix pattern generating block 150 generates a dot pattern in an M×N dot matrix in accordance with the image information supplied from the CPU, and then the dot pattern is output, as an image forming signal for each dot in the M×N dot matrix, from the dot matrix pattern generating block 150. A beam intensity setting block 151 sets the intensity of the laser beam in accordance with the image information under a condition where the duty cycle of the driving signal for each dot is less than 100%. A selecting data, such as the spatial frequency of an image, the differential coefficient of the intensity of an image or the like is calculated based on the image information supplied from the CPU. Then the dot matrix pattern generating block 150 and the beam intensity setting block 151 are alternately switched in accordance with the selecting data. In a case where a gradational image like a photograph is formed, the dot matrix pattern generating block 150 is selected. In a case where an image is formed which has a large density variation, such as a character image is formed, the beam intensity setting block 151 is selected.

Figures 31, 32:
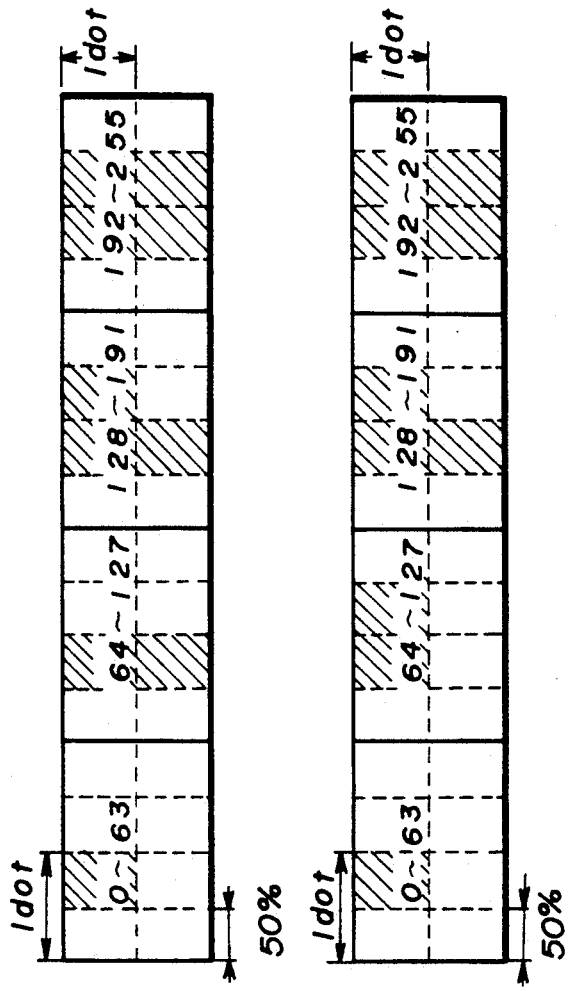
FIGS. 31 and 32 are diagrams illustrating dot patterns in a 1×2 dot matrix generated by a dot matrix pattern generating block shown in FIG. 30.

The dot matrix pattern generating block 150 generates, for example, the dot pattern in a 1×2 dot matrix, as shown in FIG. 31 or FIG. 32. As the gradational level for each dot in the 1×2 dot matrix shown in FIGS. 31 and 32 is controlled in one of 63 gradational levels, the 1×2 dot matrix can represent 256 gradational levels. In the 1×2 dot matrix shown in FIG. 31, the pulse width of the driving signal for each dot is controlled so that the duty cycle thereof is 50% and the intensity of the laser beam is controlled at one of 63 gradational levels. In the 1×2 dot matrix shown in FIG. 32, the 256 gradational levels can be represented, and the dot pattern is determined in accordance with the image information (the gradational level of the image) so that the spatial frequency in the sub scanning direction is the maximum.

The beam intensity setting block 151 sets the intensity of the laser beam in accordance with the image information under a condition, for example, where the duty cycle of the driving signal is 50%.

Figure 33:
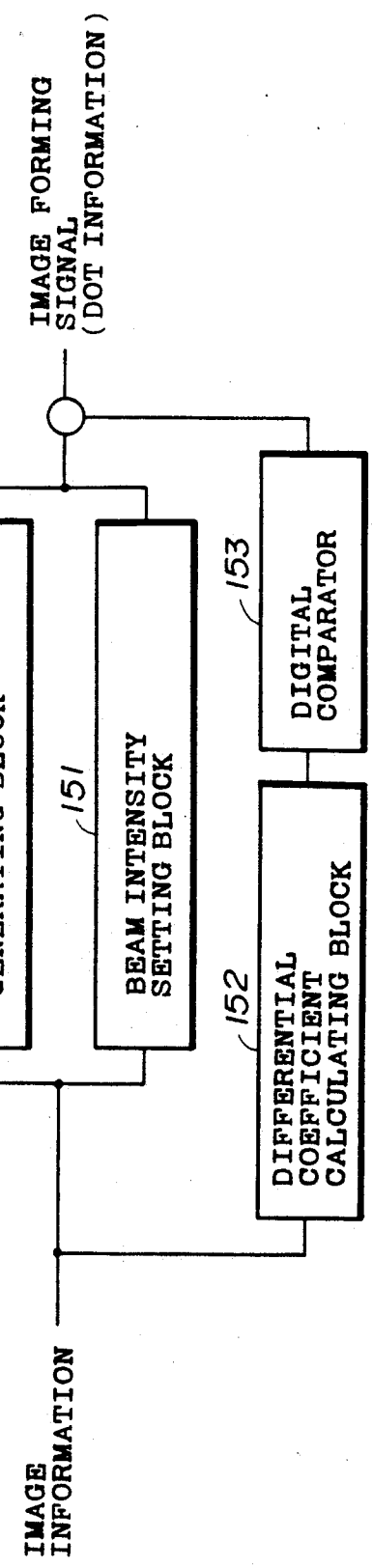
FIG. 33 is a block diagram illustrating another basic structure of the fourth embodiment of the present invention.

FIG. 33 shows an example of means for calculating the selecting data which is used for the switching of the dot matrix pattern generating block 150 and the beam intensity setting block 151. In this example, a differential coefficient of the image is calculated as the selecting data.

Referring to FIG. 33, a differential coefficient calculating block 152 calculates the differential coefficient of the image based on the image information supplied from the CPU. A digital comparator compares the differential coefficient calculated by the differential coefficient calculating block 152 with a predetermined reference value. When the differential coefficient is less than the reference value, the variation of the image density is small. Thus, in this case, the dot matrix pattern generating block 150 is selected, and then the dot pattern in accordance with the image information, as shown in FIG. 31 or FIG. 32, is output as the image forming signal (the driving pattern data) from the dot matrix pattern generating block 150. On the other hand, when the differential coefficient is equal to or greater than the reference value, the variation of the image density is large. Thus, in this case, the beam intensity setting block 151 is selected, and then the beam intensity setting block 151 sets the intensity of the laser beam in accordance with the image information supplied from the CPU under the condition where the duty cycle of the driving signal for each dot is, for example, 50%.

The differential coefficient calculating block 152 calculates the differential coefficient of the image based on the image information (the density data) in, for example, a 2×2 dot matrix shown in FIG. 34 or a 3×3 dot matrix shown in FIG. 35. In a case where the differential coefficient is calculated by use of the 2×2 dot matrix, the differential coefficient f(i,j) at a dot (i,j) having a density $A_{i,j}$ is, for example, calculated based on the following formula.

$$f(i,j) = [(A_{i-1,j} - A_{i,j})^2 + (A_{i,j} - A_{i,j-1})^2]^{\frac{1}{2}}$$

In a case where the differential coefficient at the dot (i,j) is calculated by use of the 3×3 dot matrix shown in FIG. 35, the differential coefficient is calculated as follows.

For example, Spatial filters for a secondary differential as shown in FIGS. 36A and 36B, operate on the image information arranged in the 3×3 dot matrix as shown in FIG. 35. As a result, the differential coefficient f(i,j) at the dot (i,j) is obtained.

In a case where the differential coefficient calculated by the differential coefficient calculating block 152 is in a range between 0 to 100, the reference value used in the digital comparator 153 is defined as 50. In this case, when the differential coefficient is in a range between 0 and 50, the dot matrix pattern generating block 151 is selected. On the other hand, when the differential coefficient is in a range between 51 and 100, the beam intensity setting block 151 is selected.

It is unnecessary for the dot matrix for calculating the differential coefficient to be equal to the dot matrix for representing the gradational level in the dot matrix pattern generating block 150. In addition, the dot matrix for calculating the differential coefficient is not limited to the 2×2 dot matrix shown in FIG. 34 and the 3×3 dot matrix shown in FIG. 35. The differential coefficient of the image can also be calculated by use of another M×N matrix. Further, the differential coefficient can also be calculated based on the other well known procedures.

Figure 37:
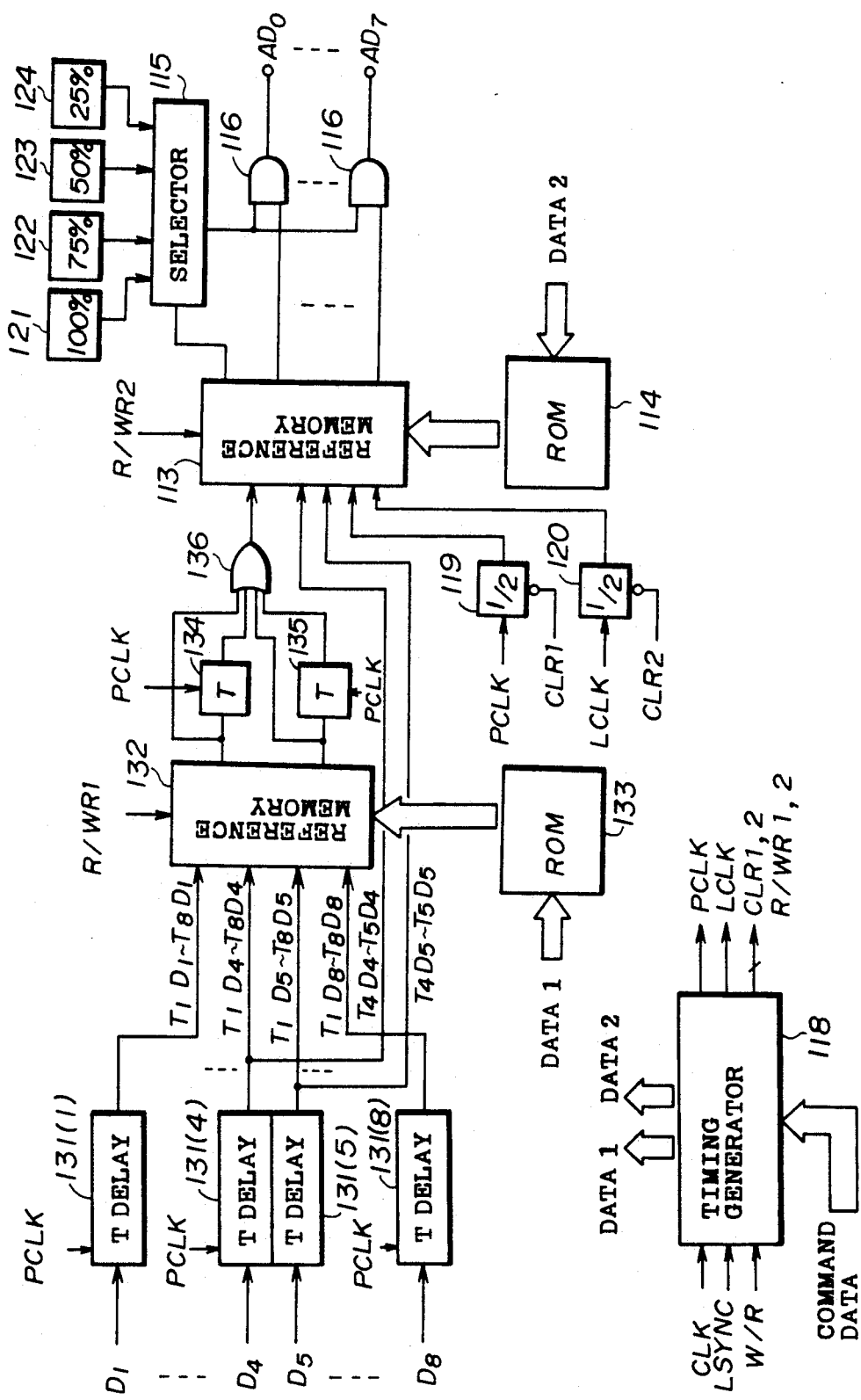
FIG. 37 is a block diagram illustrating another example of the data processing circuit shown in FIG. 1.

FIG. 37 shows an example of the data processing circuit 11 which carries out a process according to the above fourth embodiment. In FIG. 37, those parts which are the same as those shown in FIG. 13 are given the same reference numbers.

Referring to FIG. 37, eight delay circuits 131(1) through 131(8) are provided for this data processing circuit 11. Each of the delay circuits 131(1) through 131(8) corresponds to one of eight successive lines of an image and delays the image data for each dot in a corresponding line in synchronism with the clock signal PCLK. Thus, 8×8 image data $T_1D_1 - T_8D_1$, ..., $T_1D_4 - T_8D_4$, $T_1D_5 - T_8D_5$, ..., and $T_1D_8 - T_8D_8$ which are arranged in a 8×8 dot matrix are supplied from the eight delay circuits 131(1)–131(8) to a reference memory 132. The 8×8 image data are used as address information of the reference memory 132. For example, a first look-up table for determining whether or not the spatial frequency of the image is equal to or greater than a predetermined reference value is stored in the reference memory 132. The first look-up table has been previously stored in a ROM 133, and then the first look-up table is supplied from the ROM 133 to the reference memory 132. Due to the first look-up table stored in the reference memory 132, it can be determined if the spatial frequency at each of two dots, which are adjacent to each other in the sub scanning direction at the center of the 8×8 dot matrix is equal to or greater than the reference value based on the image data for the 8×8 dots. When the spacial frequency at each of the two dots is equal to or greater than the reference value, the reference memory 132 outputs the result data (1,1). When the spatial frequency at each of the two dots is less than the reference value, the reference memory 132 outputs the result data (0,0). Then, when the spatial frequency at one of the two dots is equal to or greater than the reference value, the reference memory 132 outputs the result data (1,0) or (0,1). The result data output from the reference memory 132 are respectively delayed by delay circuits 134 and 135 in synchronism with the clock signal PCLK so that the result data regarding the spatial frequency at 2×2 dots positioned at the center of the 8×8 dot matrix are obtained. The result data for the 2×2 dots are supplied to an OR gate 136, and thus the OR gate 136 outputs a judgment bit "1" when it is determined that the spatial frequency at least one of the 2×2 dots is equal to or greater than the reference value.

Image data $T_4D_4$, $T_5D_4$, $T_4D_5$ and $T_5D_5$ for 2×2 dots positioned at the center of the 8×8 dot matrix, which data is supplied from the delay circuits 131(4) and 131(5), and the judgment bit output from the OR gate 136 are supplied, as address information, to the reference memory 113. A second look-up table for determining the duty cycle of the driving signal and the beam intensity (the density data) for each dot is stored in the reference memory 113. Due to the second look-up table, the reference memory 113 outputs the intensity data for each dot in accordance with the image data and a pulse width selecting data for selecting, for example, the duty cycle of 50% when the judgment bit is "1". That is, when the spatial frequency is equal to or greater than the reference value, the beam intensity for each dot is controlled in accordance with the image data under a condition where the duty cycle of the driving signal is 50%. The reference memory 113 outputs the intensity data and pulse width selecting data in accordance with the dot pattern shown in FIG. 31 or FIG. 32 when the judgment bit supplied from the OR gate 136 is "0". That is, when the spatial frequency is less than the reference value, the gradational level is represented by use of, for example, the 1×2 dot matrix as shown in FIG. 31 or FIG. 32.

It is clear from the above description that the second look-up table stored in the reference memory 113, shown in FIG. 37, in the data processing circuit 11 has the functions of the dot matrix generating block 151 and the beam intensity setting block 152 shown in FIG. 30 and FIG. 33. In a case where the matrix generating block 151 and the beam intensity setting block 152 are alternately switched based on the differential coefficient of the image, the first look-up table stored in the reference memory 132 shown in FIG. 37 in the data processing circuit 11 has the functions of the differential coefficient calculating block 152 and the digital comparator 153.

Figure 38A:
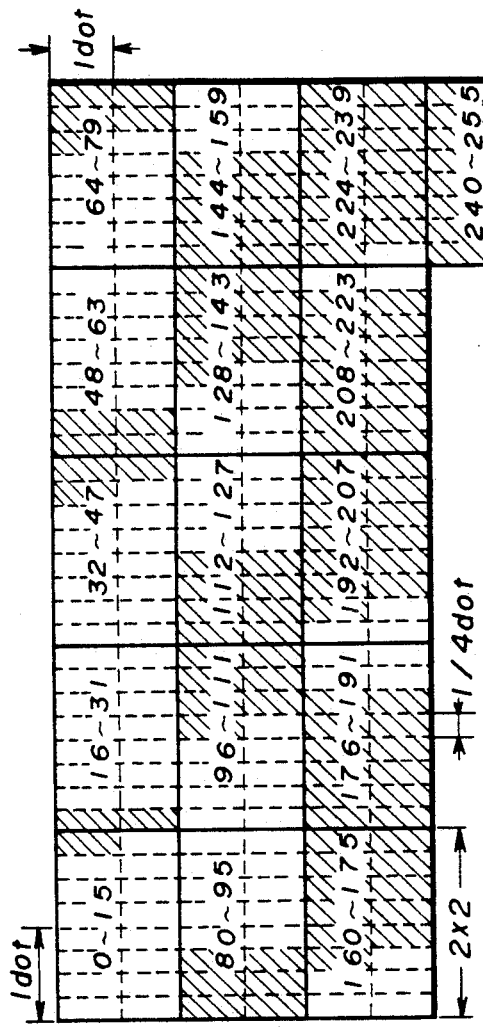
FIGS. 38A and 38B are diagrams illustrating examples of the pulse width modulation and the beam intensity modulation for each dot in the 2×2 dot matrix.
Figure 38B:
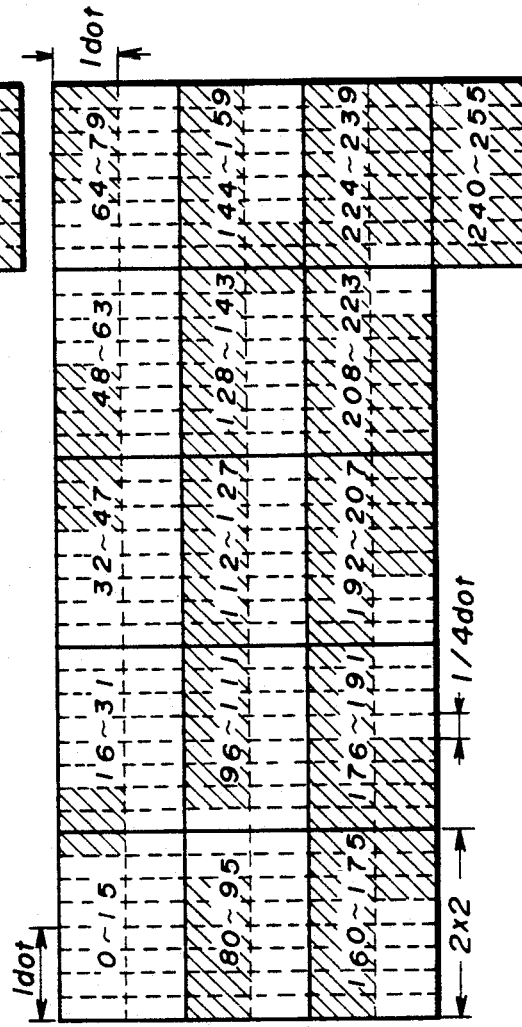
Figure 39A:
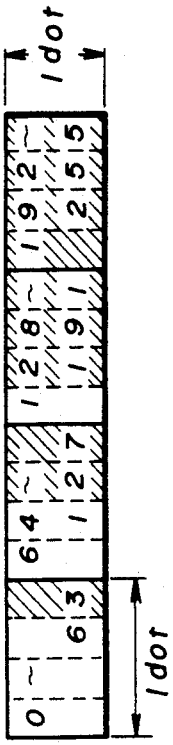
FIGS. 39A and 39B are diagrams illustrating examples of the pulse width modulation and the beam intensity modulation for each dot.
Figure 39B:
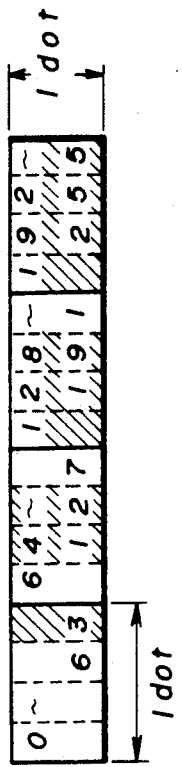

The dot matrix pattern generating block 150 shown in FIG. 30 or FIG. 33 can also generates an dot pattern in a 2×2 dot matrix as shown in FIG. 38A or FIG. 38B, and the beam intensity setting block 151 shown in FIG. 30 or FIG. 33 can also set both the pulse width and the beam intensity for each dot, as shown in FIG. 39A or FIG. 39B. In this case, the second look-up table stored in the reference memory 113 shown in FIG. 37 is defined so that the duty cycle of the driving signal and the intensity data are obtained in accordance with the dot matrix pattern in the 2×2 dot matrix shown in FIG. 38A or FIG. 38B when the judgment bit output from the OR gate 136 is "0", and the duty cycle of the driving signal and the intensity data are obtained in accordance with the pattern as shown in FIG. 39A or FIG. 39B when the judgment bit is "1". When the duty cycle of the driving signal and the intensity of the laser beam are controlled in accordance with the above patterns, an image having 256 gradational levels can be obtained.

In the dot matrix pattern in the 2×2 dot matrix shown in FIG. 31B, when the gradational level is equal to less than the 127-th level, a dot adjacent to an exposed dot in the sub scanning direction are not exposed. That is, the dots exposed in the 2×2 dot matrix shown in FIG. 31B are defined so that the spatial frequency of an image in the sub scanning direction is the largest.

Figure 41A:
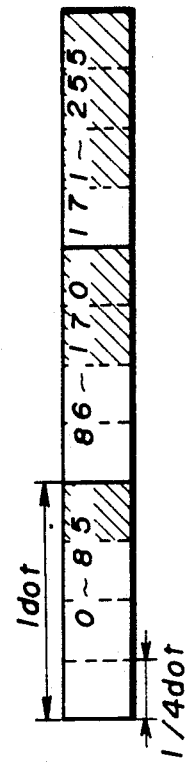
FIGS. 41A and 41B are diagrams illustrating examples of the pulse width modulation in which the duty cycle of the driving signal is less than 100% and the beam intensity modulation for each dot.
Figure 41B:
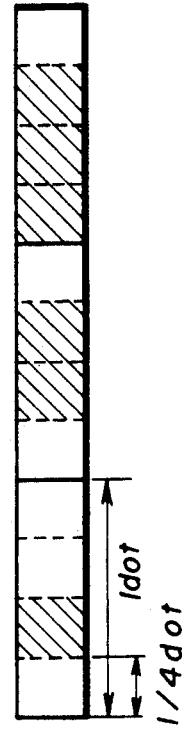
Figure 40A:
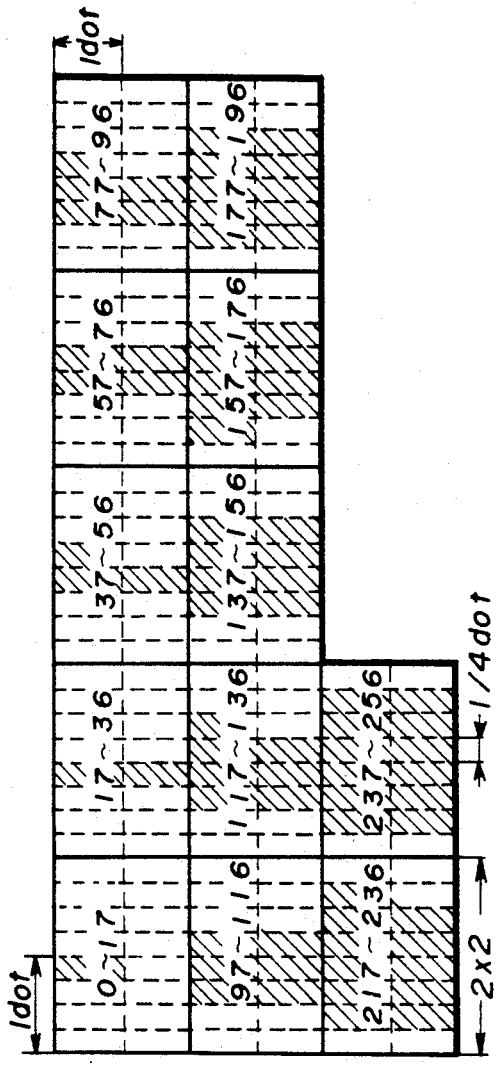
FIGS. 40A and 40B are diagrams illustrating examples of the pulse width modulation in which the duty cycle of the driving signal is less than 100% and the beam intensity modulation for each dot in the 2×2 dot matrix.
Figure 40B:
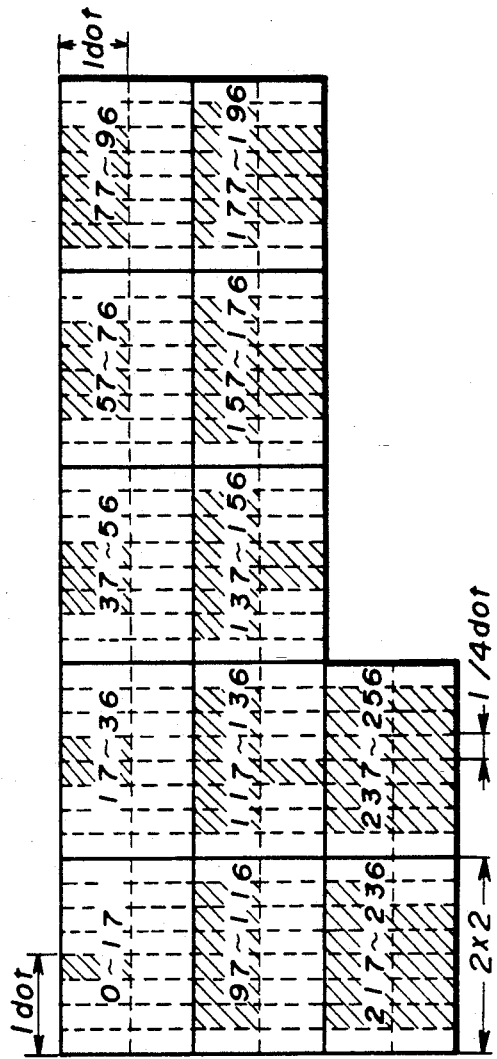

The dot matrix pattern generating block 150 shown in FIG. 30 or FIG. 33 can further also generates an dot pattern in a 2×2 dot matrix as shown in FIG. 40A or FIG. 40B, and the beam intensity setting block 151 shown in FIG. 30 or FIG. 33 can further also set both the pulse width and the beam intensity for each dot, as shown in FIG. 41A or FIG. 41B. In FIGS. 40A, 40B, 41A and 41B, the duty cycle of the driving signal is less than 100%. In this case, the second look-up table stored in the reference memory 113 shown in FIG. 37 is defined so that the duty cycle of the driving signal and the intensity data are obtained in accordance with the dot matrix pattern in the 2×2 dot matrix shown in FIG. 40A or FIG. 40B when the judgment bit output from the OR gate 136 is "0", and the duty cycle of the driving signal and the intensity data are obtained in accordance with the pattern as shown in FIG. 41A or FIG. 41B when the judgment bit is "1". When the duty cycle of the driving signal and the intensity of the laser beam are controlled in accordance with the above patterns, an image having 256 gradational levels can be obtained.

In the dot matrix pattern in the 2×2 dot matrix shown in FIG. 40B, when the gradational level is equal to less than the 116th level, a dot adjacent to an exposed dot in the sub scanning direction is not exposed. That is, the dots exposed in the 2×2 dot matrix shown in FIG. 33B are defined so that the spatial frequency of an image in the sub scanning direction is the largest The present invention is not limited to the aforementioned embodiments, and variations and modifications may be made without departing from the scope of the claimed invention.

what is claimed is:

1. An image forming apparatus comprising:
light beam emitting means for emitting a light beam;
a recording medium which moves in a first direction;
scanning means for making the light beam emitted from said light emitting means scan said recording medium in a second direction perpendicular to the first direction, wherein an electrophotography process is carried out on the surface of said recording medium;
driving data generating means for generating width data and intensity data for each dot in an image, said width data being selected in accordance with image information supplied from an external controller from a plurality of width values which have been previously determined, and said intensity data being generated in accordance with the selected width value and the image information; and driving means, coupled to said light beam emitting means and said driving data generating means, for outputting a driving signal which drives said light beam emitting means, said driving signal having a pulse width and a level for each dot in an image, the pulse width corresponding to the width data generated by said driving data generating means, and the level corresponding to the intensity data generated by said driving data generating means;

wherein each of the plurality of width values which have been previously determined is less than a value corresponding to an interval between adjacent dots formed in the direction parallel to the first direction in the image.

2. An image forming apparatus comprising:

light beam emitting means for emitting a light beam;

a recording medium which moves in a first direction;

scanning means for making the light beam emitted from said light emitting means scan said recording medium in a second direction perpendicular to the first direction, wherein an electrophotography process is carried out on the surface of said recording medium;

driving data generating means for generating width data and intensity data for each dot in a dot matrix, in which M dots are arrange din the second direction and N dots are arranged in the first direction, in accordance with image information supplied from an external controller, said width data being selected in accordance with the image information from a plurality of width values which have been previously determined, and said intensity data being determined in accordance with the selected width value and the image information; and driving means, coupled to said light beam emitting means and said driving data generating means, for outputting a driving signal which drives said light beam emitting means, said driving signal having a pulse width and a level for each dot, the pulse width corresponding to the width data generated by said driving data generating means, and the level corresponding to the intensity data generated by said driving data generating means;

wherein each of the plurality of width values which have been previously determined is less than a value corresponding to an interval between adjacent dots formed in the direction parallel to the first direction in the image.

3. An image forming apparatus comprising:

light beam emitting means for emitting a light beam;

a recording medium which moves in a first direction;

scanning means for making the light beam emitted from said light emitting means scan said recording medium in a second direction perpendicular to the first direction, wherein an electrophotography process is carried out on the surface of said recording medium;

driving data generating means for generating driving data for each dot in a dot matrix in which M dots are arranged in the second direction and N dots are arranged in the first direction, where $M \geq 1$ and $N \geq 2$, said driving data for each dot being generated so that exposure dots onto which the light beam should be projected are arranged in said dot matrix in accordance with image information supplied from an external controller under a condition where a spatial frequency of an image in a direction parallel to the first direction is the maximum; and driving means, coupled to said light beam emitting means and said driving data generating means, for outputting a driving signal which drives said light beam emitting means, said driving signal having a pulse width and a level for each dot, at least either the pulse width or the level corresponding to the driving data for each dot generated by said driving data generating means.

4. An apparatus as claimed in claim 3, wherein said driving data generated by said driving data generating means includes intensity data which is determined in accordance with the image information supplied from the external controller, and wherein said driving signal output from said driving means has a pulse width and a level for each dot, the pulse width being a predetermined value less than a value corresponding to an interval between adjacent dots formed in a direction parallel to the first direction, and the level corresponding to the intensity data generated by said driving data generating means.

5. An apparatus as claimed in claim 3, wherein said driving data generated by said driving data generating means includes width data and intensity data for each dot, said width data being selected in accordance with the image information supplied from the external controller from a plurality of width values which have been previously determined, and said intensity data being generated in accordance with the selected width value and the image information, and wherein said driving signal output from said driving means has a pulse width and a level for each dot, the pulse width corresponding to the width data generated by said driving data generating means, and the level corresponding to the intensity data generated by said driving data generating means.

6. An apparatus as claimed in claim 3, wherein said light beam emitting means comprises a semiconductor laser unit emitting a laser beam, and said driving control means includes;

detecting means for detecting an intensity of the laser beam emitted from said semiconductor laser unit, current supplying means, coupled to said semiconductor laser unit and said driving data generating means, for supplying a current corresponding to the intensity data generated by said driving data generating means, as a forward current, to said semiconductor laser unit, and a light-electricity negative feed back loop, coupled to said semiconductor laser unit and said detecting means, for controlling the forward current of said semiconductor laser unit so that the intensity of the laser beam detected by said detecting means corresponds to the intensity data generated by said driving data generating means.

7. An image forming apparatus, comprising:

a) light beam emitting means for emitting a light beam;

b) a recording medium which moves in a first direction;

c) scanning means for making the light beam emitted from said light emitting means scan said recording medium in a second direction perpendicular to the first direction, wherein an electrophotography process is carried out on the surface of said recording medium;

d) driving data generating means including:

1) a first generating means for generating width data and intensity data for each dot in an image in accordance with image information supplied from an external controller, said width data having a value less than a value corresponding to an interval between adjacent dots in a direction parallel to the first direction, said intensity data being generated in accordance with the image information;

2) second generating means for generating driving data for each dot in a dot matrix in which M dots are arranged in the second direction and N dots are arranged in the first direction in accordance with image information supplied from an external controller; and 3) selecting means for selecting either said first generating means or said second generating means in accordance with the image information supplied from the external controller, wherein said driving data generating means outputs the width data and the intensity data when said first generating means is selected, and outputs the driving data when said second generating means is selected; and e) driving means, coupled to said light beam emitting means and said driving data generating means, for outputting a driving signal which drives said light beam emitting means, said driving signal having a pulse width and a level for each dot, said pulse width and said level corresponding to the width data and the intensity data output from said first generating means when said first generating means is selected, and said pulse width and said level corresponding to the driving data output from said second generating means when said second generating means is selected;

wherein said selecting means includes:

1) first calculating means for calculating a spatial frequency at each dot in an image based on the image information supplied from the external controller; and 2) first determining means for determining whether or not the spatial frequency calculated by said first calculating means is equal to or greater than a reference value; and wherein said selecting means selects said first generating means when said first determining means determines that the spatial frequency is equal to or greater than the reference value, and selects said second generating means when said first determining means determines that the spatial frequency is less than the reference value.

8. An image forming apparatus, comprising:

a) light beam emitting means for emitting a light beam;

b) a recording medium which moves in a first direction;

c) scanning means for making the light beam emitted from said light emitting means scan said recording medium in a second direction perpendicular to the first direction, wherein an electrophotography process is carried out on the surface of said recording medium;

d) driving data generating means including:

1) a first generating means for generating width data and intensity data for each dot in an image in accordance with image information supplied from an external controller, said width data having a value less than a value corresponding to an interval between adjacent dots in a direction parallel to the first direction, said intensity data being generated in accordance with the image information;

2) second generating means for generating driving data for each dot in a dot matrix in which M dots are arranged in the second direction and N dots are arranged in the first direction in accordance with image information supplied from an external controller; and 3) selecting means for selecting either said first generating means or said second generating means in accordance with the image information supplied from the external controller, wherein said driving data generating means outputs the width data and the intensity data when said first generating means is selected, and outputs the driving data when said second generating means is selected; and e) driving means, coupled to said light beam emitting means and said driving data generating means, for outputting a driving signal which drives said light beam emitting means, said driving signal having a pulse width and a level for each dot, said pulse width and said level corresponding to the width data and the intensity data output from said first generating means when said first generating means is selected, and said pulse width and said level corresponding to the driving data output from said second generating means when said second generating means is selected;

wherein said selecting means includes:

1) second calculating means for calculating a differential coefficient of density at each dot in an image based on the image information supplied from the external controller; and 2) second determining means for determining whether or not the differential coefficient calculated by said second calculating means is equal to or greater than a reference value; and wherein said selecting means selects said first generating means when said second determining means determines that the differential coefficient is equal to or greater than the reference value, and selects said second generating means when said second determining means determines that the spatial frequency is less than the reference value.

9. An image forming apparatus, comprising:

a) light beam emitting means for emitting a light beam;

b) a recording medium which moves in a first direction;

c) scanning means for making the light beam emitted from said light emitting means scan said recording medium in a second direction perpendicular to the first direction, wherein an electrophotography process is carried out on the surface of said recording medium;

d) driving data generating means including:

1) a first generating means for generating width data and intensity data for each dot in an image in accordance with image information supplied from an external controller, said width data having a value less than a value corresponding to an interval between adjacent dots in a direction parallel to the first direction, said intensity data being generated in accordance with the image information;

2) second generating means for generating driving data for each dot in a dot matrix in which M dots are arranged in the second direction and N dots are arranged in the first direction in accordance with image information supplied from an external controller; and 3) selecting means for selecting either said first generating means or said second generating means in accordance with the image information supplied from the external controller, wherein said driving data generating means outputs the width data and the intensity data when said first generating means is selected, and outputs the driving data when said second generating means is selected; and e) driving means, coupled to said light beam emitting means and said driving data generating means, for outputting a driving signal which drives said light beam emitting means, said driving signal having a pulse width and a level for each dot, said pulse width and said level corresponding to the width data and the intensity data output from said first generating means when said first generating means is selected, and said pulse width and said level corresponding to the driving data output from said second generating means when said second generating means is selected;

wherein M is equal to or greater than 1 and N is equal to or greater than 2 in the dot matrix; and wherein said second generating means generates driving data for each dot so that exposure dots onto which the light beam should be projected are arranged in said dot matrix in accordance with the image information supplied from the external controller under a condition where a spatial frequency of an image in a direction parallel to the first direction is the maximum.

10. An image forming apparatus, comprising:

a) light beam emitting means for emitting a light beam;

b) a recording medium which moves in a first direction;

c) scanning means for making the light beam emitted from said light emitting means scans said recording medium in a second direction perpendicular to the first direction, wherein an electrophotography process is carried out on the surface of said recording medium;

d) driving data generating means including:

1) a first generating means for generating width data and intensity data for each dot in an image in accordance with image information supplied from an external controller, said width data being selected in accordance with image information supplied from an external controller from a plurality of width values which have been previously determined, and said intensity data being generated in accordance with the selected width value and the image information;

2) second generating means for generating driving data for each dot in a dot matrix in which M dots are arranged in the second direction and N dots are arranged in the first direction in accordance with the image information supplied from the external controller; and 3) selecting means for selecting either said first generating means or said second generating means in accordance with the image information supplied from the external controller, wherein said driving data generating means outputs the width data and the intensity data when said first generating means is selected, and outputs the driving data when said second generating means is selected; and e) driving means, coupled to said light beam emitting means and said driving data generating means, for outputting a driving signal which drives said light beam emitting means;

wherein said driving signal has a pulse width and a level for each dot;

wherein said pulse width and said lever correspond to the width data and the intensity data output from said first generating means when said first generating means is selected;

wherein said pulse width and said level correspond to the driving data output from said second generating means when said second generating means is selected;

wherein said selecting means includes:

1) first calculating means for calculating a spatial frequency at each dot in an image based on the image information supplied from the external controller; and 2) first determining means for determining whether or not the spatial frequency calculated by said first calculating means is equal to or greater than a reference value; and wherein said selecting means selects said first generating means when said first determining means determines that the spatial frequency is equal to or greater than the reference value, and selects said second generating means when said first determining means determines that the spatial frequency is less than the reference value.

11. An image forming apparatus, comprising:

a) light beam emitting means for emitting a light beam;

b) a recording medium which moves in a first direction;

c) scanning means for making the light beam emitted from said light emitting means scans said recording medium in a second direction perpendicular to the first direction, wherein an electrophotography process is carried out on the surface of said recording medium;

d) driving data generating means including:

1) a first generating means for generating width data and intensity data for each dot in an image in accordance with image information supplied from an external controller, said width data being selected in accordance with image information supplied from an external controller from a plurality of width values which have been previously determined, and said intensity data being generated in accordance with the selected width value and the image information;

2) second generating means for generating driving data for each dot in a dot matrix in which M dots are arranged in the second direction and N dots are arranged in the first direction in accordance with the image information supplied from the external controller; and 3) selecting means for selecting either said first generating means or said second generating means in accordance with the image information supplied from the external controller, wherein said driving data generating means outputs the width data and the intensity data when said first generating means is selected, and outputs the driving data when said second generating means is selected; and e) driving means, coupled to said light beam emitting means and said driving data generating means, for outputting a driving signal which drives said light beam emitting means;

wherein said driving signal has a pulse width and a level for each dot;

wherein said pulse width and said level correspond to the width data and the intensity data output from said first generating means when said first generating means is selected;

wherein said pulse width and said level correspond to the driving data output from said second generating means when said second generating means is selected;

wherein said selecting means includes:
1) second calculating means for calculating a differential coefficient of density at each dot in an image based on the image information supplied from the external controller; and
2) second determining means for determining whether or not the differential coefficient calculated by said second calculating means is equal to or greater than a reference value; and wherein said selecting means selects said first generating means when said first determining means determines that the differential coefficient is equal to or greater than the reference value, and selects said second generating means when said second determining means determines that the spatial frequency is less than the reference value.

12. An image forming apparatus, comprising:

a) light beam emitting means for emitting a light beam;

b) a recording medium which moves in a first direction;

c) scanning means for making the light beam emitted from said light emitting means scans said recording medium in a second direction perpendicular to the first direction, wherein an electrophotography process is carried out on the surface of said recording medium;

d) driving data generating means including:
1) a first generating means for generating width data and intensity data for each dot in an image in accordance with image information supplied from an external controller, said width data being selected in accordance with image information supplied from an external controller from a plurality of width values which have been previously determined, and said intensity data being generated in accordance with the selected width value and the image information;
2) second generating means for generating driving data for each dot in a dot matrix in which M dots are arranged in the second direction and N dots are arranged in the first direction in accordance with the image information supplied from the external controller; and 3) selecting means for selecting either said first generating means or said second generating means in accordance with the image information supplied from the external controller, wherein said driving data generating means outputs the width data and the intensity data when said first generating means is selected, and outputs the driving data when said second generating means is selected; and e) driving means, coupled to said light beam emitting means and said driving data generating means, for outputting a driving signal which drives said light beam emitting means;

wherein said driving signal has a pulse width and a level for each dot;

wherein said pulse width and said level correspond to the width data and the intensity data output from said first generating means when said first generating means is selected;

wherein said pulse width and said level correspond to the driving data output from said second generating means when said second generating means is selected; and wherein each of the plurality of width values which have been previously determined is less than a value corresponding to an internal between adjacent dots formed in the direction parallel to the first direction in the image.

13. An image forming apparatus, comprising:

a) light beam emitting means for emitting a light beam;

b) a recording medium which moves in a first direction;

c) scanning means for making the light beam emitted from said light emitting means scans said recording medium in a second direction perpendicular to the first direction, wherein an electrophotography process is carried out on the surface of said recording medium;

d) driving data generating means including:
1) a first generating means for generating width data and intensity data for each dot in an image in accordance with image information supplied from an external controller, said width data being selected in accordance with image information supplied from an external controller from a plurality of width values which have been previously determined, and said intensity data being generated in accordance with the selected width value and the image information;
2) second generating means for generating driving data for each dot in a dot matrix in which M dots are arranged in the second direction and N dots are arranged in the first direction in accordance with the image information supplied from the external controller; and
3) selecting means for selecting either said first generating means or said second generating means in accordance with the image information supplied from the external controller, wherein said driving data generating means outputs the width data and the intensity data when said first generating means is selected, and outputs the driving data when said second generating means is selected; and e) driving means, coupled to said light beam emitting means and said driving data generating means, for outputting a driving signal which drives said light beam emitting means;
wherein said driving signal has a pulse width and a level for each dot;
wherein said pulse width and said level correspond to the width data and the intensity data output from said first generating means when said first generating means is selected;
wherein said pulse width and said level correspond to the driving data output from said second generating means when said second generating means is selected;
wherein M is equal to or greater than 1 and N is equal to or greater than 2 in the dot matrix; and
wherein said second generating means generates driving data for each dot so that exposure dots onto which the light beam should be projected are arranged in said dot matrix in accordance with the image information supplied from the external controller under a condition where a spatial frequency of an image in a direction parallel to the first direction is the maximum.

14. An image forming apparatus comprising:
light beam emitting means for emitting a light beam;
a recording medium which moves in a first direction;
scanning means for making the light beam emitted from said light emitting means scan said recording medium in a second direction perpendicular to the first direction, wherein an electrophotography process is carried out on the surface of said recording medium;
driving data generating means including a first generating means for generating driving data for each dot in an image in accordance with image information supplied from an external controller, second generating means for generating driving data for each dot in a dot matrix in which M dots are arranged in the second direction and N dots are arranged in the first direction, where M≧1 and N≧2, said driving data for each dot being generated so that exposure dots onto which the light beam should be projected are arranged in said dot matrix in accordance with the image information supplied from the external controller under a condition where a spatial frequency of an image in a direction parallel to the first direction is the maximum, and selecting means for selecting either said first generating means or said second generating means in accordance with the image information supplied from the external controller; and
driving means, coupled to said light beam emitting means and said driving data generating means, for outputting a driving signal which drives said light beam emitting means, said driving signal having a pulse width and a level for each dot, at least either said pulse width or said level corresponding to the driving data output from said first generating means when said first generating means is selected, and said pulse width and said level corresponding to the driving data output from said second generating means when said second generating means is selected.

15. An apparatus as claimed in claim 14, wherein said selecting means comprises first calculating means for calculating a spatial frequency at each dot in an image based on the image information supplied from the external controller and first determining means for determining whether of not the spatial frequency calculated by said first calculating means is equal to or greater than a reference value, and wherein said selecting means selects said first generating means when said first determining means determines that the spatial frequency is equal to or greater than the reference value, and selects said second generating means when said first determining means determines that the spatial frequency is less than the reference value.

16. An apparatus as claimed in claim 14, wherein said selecting means comprises second calculating means for calculating a differential coefficient of density at each dot in an image based on the image information supplied from the external controller and second determining means for determining whether of not the differential coefficient calculated by said second calculating means is equal to or greater than a reference value, and wherein said selecting means selects said first generating means when said first determining means determines that the differential coefficient is equal to or greater than the reference value, and selects said second generating means when said second determining means determines that the spatial frequency is less than the reference value.

17. An apparatus as claimed in claim 14, wherein said light beam emitting means comprises a semiconductor laser unit which emits a laser beam, and said driving control means includes;
detecting means for detecting an intensity of the laser beam emitted from said semiconductor laser unit,
current supplying means, coupled to said semiconductor laser unit and said driving data generating means, for supplying a current corresponding to the intensity data generated by said driving data generating means, as a forward current, to said semiconductor laser unit, and
a light-electricity negative feed back loop, coupled to said semiconductor laser unit and said detecting means, for controlling the forward current of said semiconductor laser unit so that the intensity of the laser beam detected by said detecting means corresponds to the intensity data generated by said driving data generating means.

* * * * *